US006967802B1

(12) United States Patent
Bailey

(10) Patent No.: US 6,967,802 B1
(45) Date of Patent: Nov. 22, 2005

(54) SYSTEM AND METHOD FOR REDUCING LATENCY FOR SERIALLY ACCESSIBLE MEDIA

(75) Inventor: Wayne P. Bailey, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 264 days.

(21) Appl. No.: 10/146,209

(22) Filed: May 15, 2002

(51) Int. Cl.[7] ........................ G11B 15/18; G11B 17/00; G11B 15/46

(52) U.S. Cl. .................. 360/72.1; 360/72.3; 360/78.04

(58) Field of Search ........................... 360/71–72.3, 75, 360/78.04, 92, 74.1, 78.01, 78.02, 78.03, 360/90, 91; 711/161–162

(56) References Cited

U.S. PATENT DOCUMENTS 4,796,110 A * 1/1989 Glass et al. .................... 360/53
5,463,758 A * 10/1995 Ottesen ...................... 711/114
5,623,471 A * 4/1997 Prigge ......................... 369/84
5,883,864 A * 3/1999 Saliba ......................... 360/92
6,061,194 A 5/2000 Bailey
6,662,281 B2 * 12/2003 Ballard et al. .............. 711/162

* cited by examiner

*Primary Examiner*—David Hudspeth
*Assistant Examiner*—Jason Olson
(74) *Attorney, Agent, or Firm*—Wayne P. Bailey

(57) ABSTRACT

A technique for reducing the access time in a storage system having serially accessible media. One or more duplicate copies of data are maintained at different offset locations on serial media. When a request is made to read the data, a determination is made as to which copy of the data—either the original data or one of the duplicate copies—will have the shortest access time for accessing the data. Generally, this would be the data copy that will be closest to the data transducer when the tape is positioned for access, such as a tape cartridge being loaded in a tape drive. Once the tape is ready to be accessed, the tape is positioned to access the copy of the data that is in closest linear proximity with the reading transducer. Thus, the copy of the data having the lowest access latency is chosen to satisfy the particular I/O request.

18 Claims, 12 Drawing Sheets

SYSTEM AND METHOD FOR REDUCING LATENCY FOR SERIALLY ACCESSIBLE MEDIA

FIELD OF THE INVENTION

The present invention relates generally to systems and methods for reading data from, and writing data to, serially accessible storage media such as tape and, more particularly, to systems and methods for storing multiple copies of data on different locations either on the same serially accessible storage media or on a different serially accessible storage media.

BACKGROUND OF THE INVENTION

There are various types of media used for the storage of data. Each media type has particular characteristics that typically dictate the environment/application that it is best suited for. For example, disk media is typically used for real-time data storage when fast access to a particular location on the media is required. Tape media, and in particular magnetic tape, is typically used for off-line data storage of large amounts of data such as a backup or archive copy of data. Disk media is relatively expensive when compared to other types of media such as tape. Tape has the disadvantage of a relatively slow access time, when compared to disk, as the tape is wound about a reel and must be accessed serially by either forwarding or rewinding the tape to the desired location for reading/writing data. It would be desirable to improve the access time for tape media such that the cost benefit of tape could be used in more types of environments/applications that traditionally use disk (with its associated faster access time and lower latency). In addition, with appropriate management of the data, the technique for improving serially accessible media's access time can provide the additional benefit of data redundancy.

As seen in FIGS. 1A–1C, tape media used for the storage of computer data can be packaged in many different forms. FIG. 1A shows a single reel tape cartridge, such as that used with a 9490 tape drive offered by Storage Technology Corporation, headquartered in Louisville, Colo. This tape cartridge 12 has a single supply reel 13 and hub 14 contained therein, with a portion 15 of the tape media 16 wrapped around hub 14 when in a loaded position (i.e. threaded and ready for access by a transducer 20 such as a magnetic read/write head). Another portion of the tape 16 is shown threaded along a tape path defined by a plurality of rollers or capstans 18. Another portion 17 of the tape is shown as being wound about a hub 24 within take-up reel 22. This tape is shown to be in a loaded position within a tape drive—where the tape is adjacent to the transducer 20 for data access by the tape drive. Motors (not shown) are used to drive the hubs 14 and 24 such that the tape can be positioned in a forward or reverse direction such that different linear portions of the tape can be positioned adjacent the transducer 20 for data access (e.g. reading or writing). When in an unloaded position, for example when the cartridge is not loaded in a tape drive, the tape would not extend along the tape path, but rather be exclusively contained within the tape cartridge 12. In a single reel cartridge system, the take-up reel 22 is contained within and is a part of the tape drive.

FIG. 1B shows a dual reel tape cartridge 112, such as that used with a 9840 tape drive also offered by Storage Technology Corporation. This tape cartridge 112 has both a supply reel 113/hub 114 and a take-up reel 122/hub 124 contained therein. Tape 116 is shown threaded along a tape path defined by a plurality of rollers or capstans 118. When loaded in a tape drive, the tape is accessible by a transducer (not shown) via aperture 100. Motors (not shown) are used to drive the hubs 114 and 124 such that the tape can be positioned in a forward or reverse direction such that different linear portions of the tape can be positioned adjacent a transducer for data access (e.g. reading or writing).

FIG. 1C shows a dual reel cassette 212, such as that originally used with a VCR tape recorder/player traditionally used for viewing/recording programming on/off a television or monitor, and now being used for the storage of data using helical recording. Such helical data storage is described in U.S. Pat. No. 5,128,815, which is hereby incorporated by reference as background material. There is a supply reel 213/hub 214 and take-up reel 222/hub 224, with one end of tape 216 attached to the supply reel 213, and the other end of tape 216 attached to the take-up reel 222. Again, a plurality of rollers or capstans 218 are used to define a tape path, which in this instance positions tape outside of cartridge 212 to wrap the tape about a helical transducer 220.

U.S. Pat. No. 6,061,194 describes a technique for writing duplicate data at a fixed azmith angle from the original data on a disk platter, in order to reduce rotational latency when reading the data. This duplicate data is written on the same platter as the original data, and the media is relatively expensive when compared to tape.

It would be advantage to provide a technique for improving access time for serially accessible storage media, and to improve data redundancy in a storage system having such media. Examples of serially accessible media include magnetic tape, optical tape, and charge coupled device (CCD) shift registers.

SUMMARY OF THE INVENTION

A system and method for reducing the access time in a storage system having serially accessible media. One or more duplicate copies of data are maintained at different offset locations on serial media, which in the preferred embodiment is tape (magnetic or optical). When a request is made to read the data, a determination is made as to which copy of the data—either the original data or one of the duplicate copies—will have the shortest access time for accessing the data. Generally, this would be the data copy that will be closest to the data transducer when the tape is positioned for access, such as a tape cartridge being loaded in a tape drive. Once the tape is ready to be accessed, the tape is positioned to access the copy of the data that is in closest linear proximity with the reading transducer. Thus, the copy of the data having the lowest access latency is chosen to satisfy the particular I/O request.

In one embodiment, the duplicate data is located at a different offset location than the original data on the same tape media.

In an alternate embodiment, the duplicate data is located at a different offset location than the original data on a different tape media.

In yet another embodiment, multiple duplicate copies of the original data are maintained at a plurality of differing offset locations, either on the same media, some on the same media and some on different media, or all on different media.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF PREFERRED EMBODIMENT

Figure 1B:
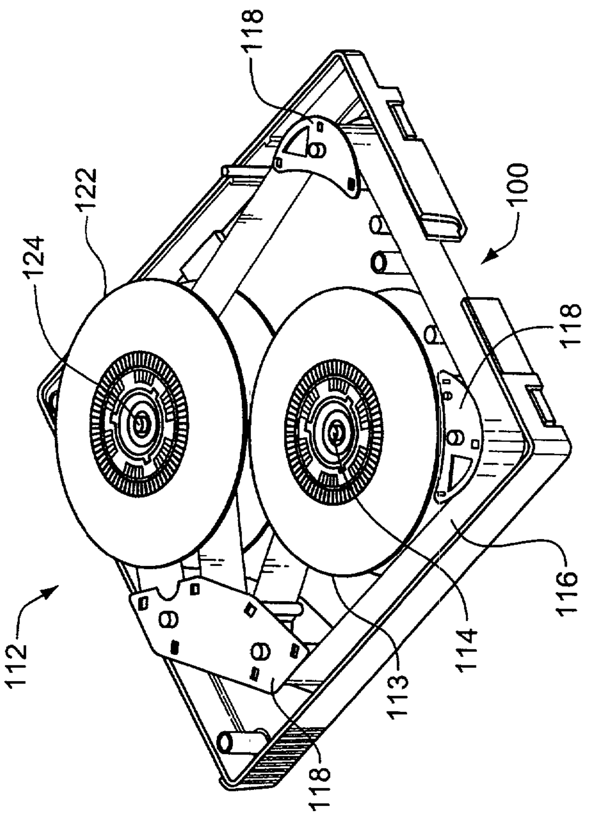
FIG. 1B is a drawing illustrating a dual reel tape cartridge.
Figure 1C:
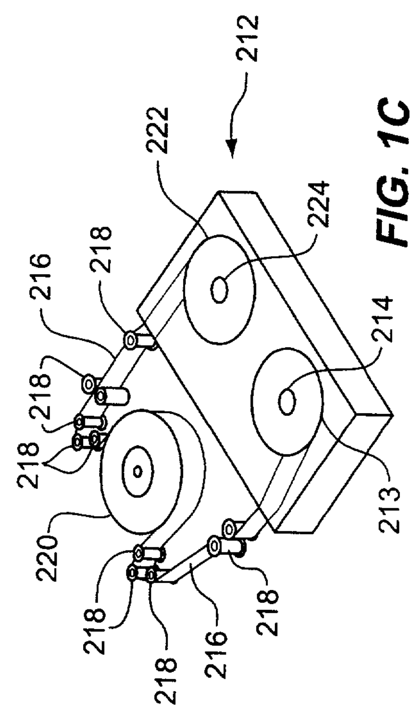
FIG. 1C is a drawing illustrating a dual reel cassette.
Figure 1A:
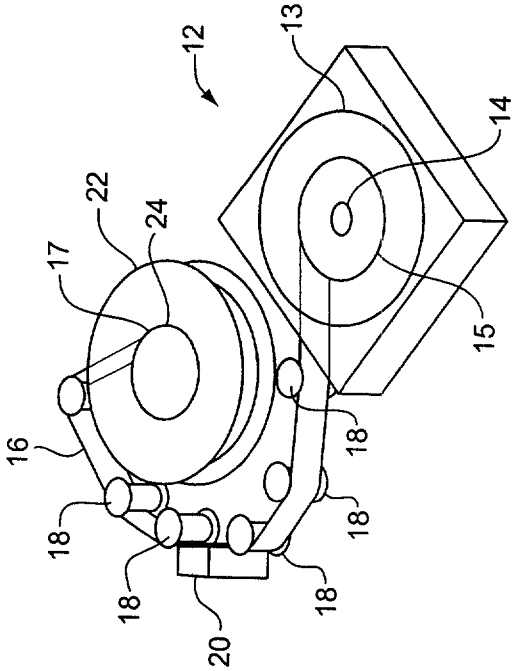
FIG. 1A is a drawing illustrating a single reel tape cartridge shown in a loaded position within a tape drive.
Figure 2A:
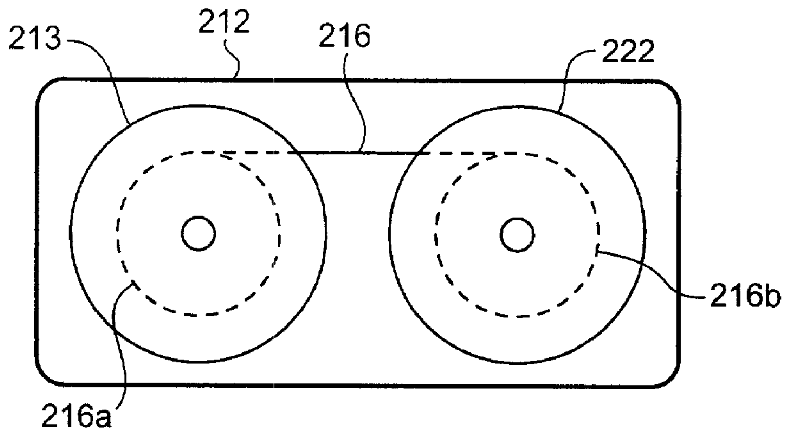
FIG. 2A is a drawing illustrating a dual reel cassette with a midway load point.
Figure 2B:
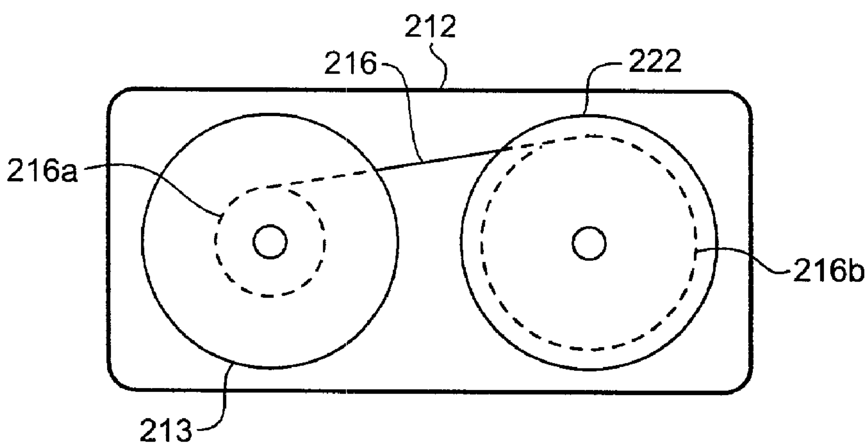
FIG. 2B is a drawing illustrating a dual reel cassette with a majority of tape on the take-up reel.
Figure 2C:
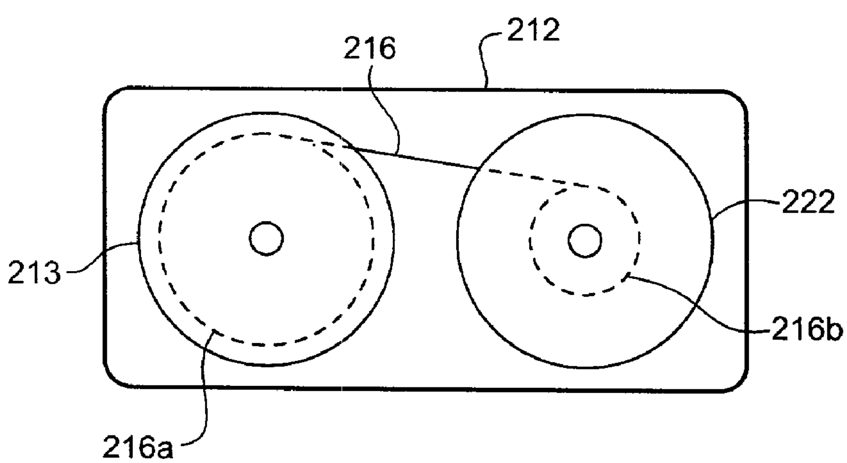
FIG. 2C is a drawing illustrating a dual reel cassette with a majority of tape on the supply reel.

A dual reel cassette such as that shown in FIG. 1C is shown in various tape wrap stages in FIGS. 2A–2C. FIG. 2A shows a cassette where the tape 216*a* on supply reel 213 is approximately the same quantity as tape 216*b* on take-up reel 222. This tape is considered to have a tape load point at the midway point of the tape, the tape load point being the portion of the tape that would be adjacent to or in contact with a transducer in the tape drive when the tape cassette is initially loaded in the tape drive. By maintaining tape in this midway position—as opposed to being fully wound onto either reel—the average time to access a given linear position on the tape (i.e. the access latency) is one-half that of a fully rewound tape.

FIG. 2B shows an example where the majority of the tape 216 is on take-up reel 222 (as shown by 216*b*), with a relatively smaller portion of tape 216 on supply reel 213 (as shown by 216*a*). If this were the state of the tape when the cartridge 212 were loaded into a tape drive (not shown), then on average it would be quicker to seek to a given tape data location for tape 216*a* on supply reel 213 than it would be to seek to a given tape data location for tape 216*b* on take-up reel 222. In other words, the average access time (i.e. latency) for data residing on the portion of tape on supply reel 213 would be less than the average access time for data residing on the portion of tape on take-up reel 222.

FIG. 2C shows an example where the majority of the tape 216 is on supply reel 213 (as shown by 216*a*), with a relatively smaller portion of tape 216 on take-up reel 222 (as shown by 216*b*). If this was the state of the tape when the cartridge 212 were loaded into a tape drive (not shown), then on average it would be quicker to seek to a given tape data location for tape 216*b* on take-up reel 222 than it would be to seek to a given tape data location for tape 216*a* on supply reel 213. The average access time for data residing on the portion of tape on take-up reel 222 would be less than the average access time for data residing on the portion of tape on supply reel 213.

Figure 3A:
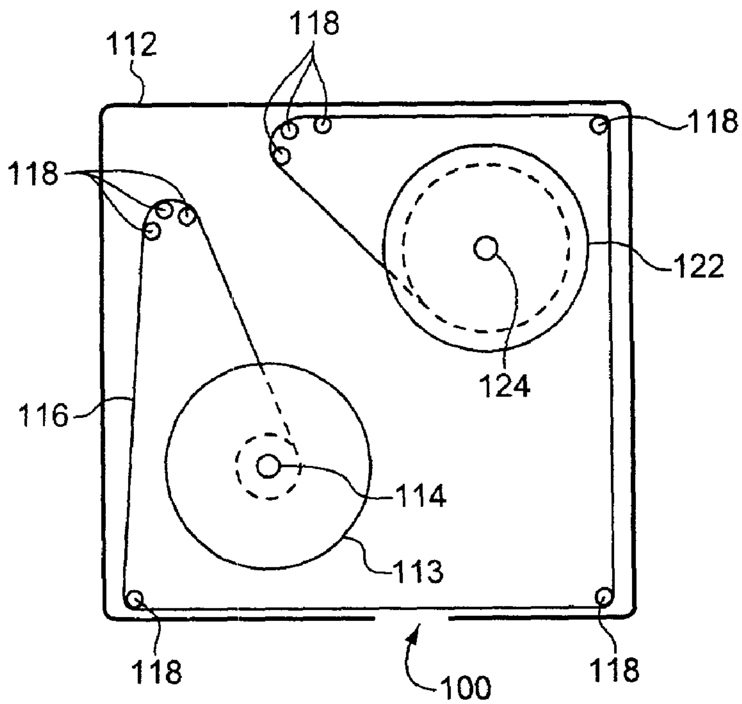
FIG. 3A is a drawing illustrating a dual reel cartridge with a majority of tape on the take-up reel.
Figure 3B:
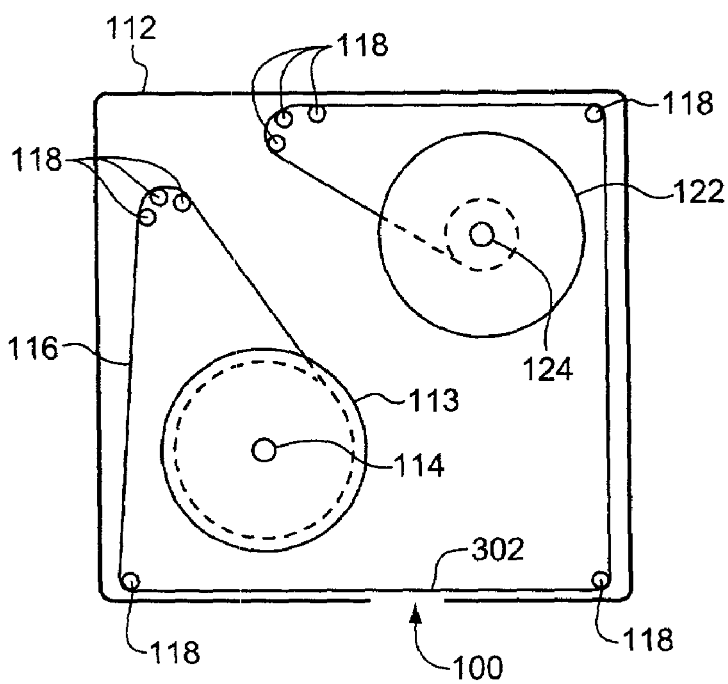
FIG. 3B is a drawing illustrating a dual reel cartridge with a majority of tape on the supply reel.

FIGS. 3A and 3B show various tape wrap states for a dual cartridge tape cartridge such as that shown in FIG. 1B, with FIG. 3A showing the situation with a majority of tape 116 wrapped on take-up reel 122, and FIG. 3B showing the situation with a majority of tape 116 wrapped on supply reel 113. For the cartridge shown in FIG. 3A, the average access time for data residing on the portion of tape on supply reel 113 would be less than the average access time for data residing on the portion of tape on take-up reel 222. For the cartridge shown in FIG. 3B, the average access time for data residing on the portion of tape on take-up reel 122 would be less than the average access time for data residing on the portion of tape on supply reel 113.

In accordance with the present invention, one or more duplicate copies of data are maintained at different offset locations on serially accessible media. When a request is made to read the data, a determination is made as to which copy of the data will be closest to the data transducer when the tape is positioned for access, such as by being loaded in a tape drive. In other words, a determination is made as to which copy of the data will have the lowest access latency. This is the data copy that is used to satisfy the I/O request. Once the tape is ready to be accessed, the tape is positioned to access this data. In one embodiment, the duplicate data is located at a different offset location than the original data on the same tape media. In an alternate embodiment, the duplicate data is located at a different offset location than the original data on a different tape media. In yet another embodiment, multiple duplicate copies of the original data are maintained at a plurality of differing offset locations, either on the same media, some on the same media and some on different media, or all on different media.

Figure 4A:
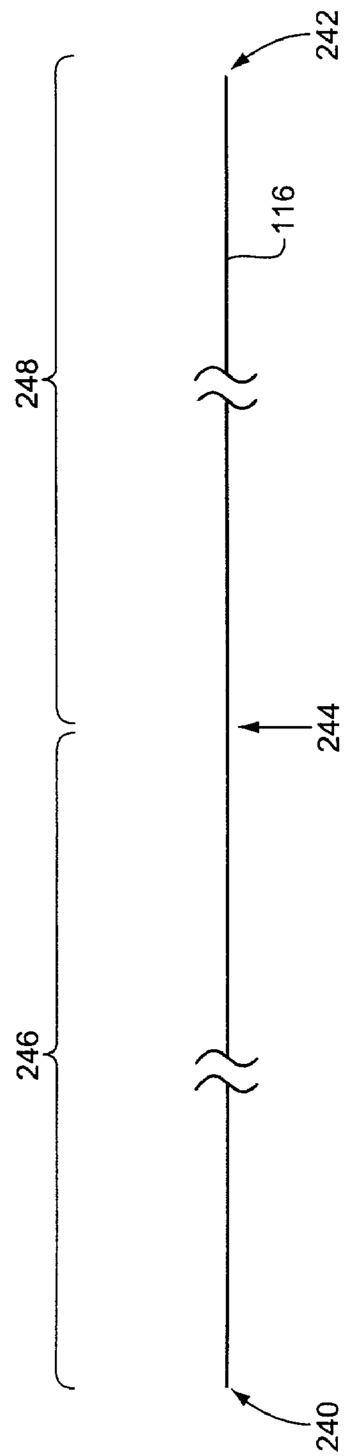
FIG. 4A is a drawing illustrating a two zone tape configuration.

FIG. 4A illustratively shows a tape 116 linearly extended in a stand-alone fashion—i.e. not wrapped on reels. It has a first end 240 (which would normally be attached to a reel when operable in a tape system), a second end 242 (which would normally be attached to either another reel on a two-reel cartridge, or to a leader pin/block in a single reel cartridge), and a middle portion 244. The tape can thus be considered as having two zones 246 and 248, the first zone 246 containing the half of the tape 116 from the first end 240 and extending to the middle portion 244, and the second zone 248 containing the half of the tape 116 from the middle portion 244 and extending to the second end 242.

In the preferred embodiment, if original data is written to a tape location in first zone 246, a duplicate copy of the data is written to a tape location in second zone 248, either on the same tape or on a tape in a different cartridge. This provides an overall reduction in average data access time for subsequent data access, as will now be illustrated with reference to FIGS. 3A and 3B.

Assume that FIG. 3A and FIG. 3B show the identical tape cartridge 112 in differing states. FIG. 3A shows what is defined to be a take-up biased state of cartridge 112, where the take-up reel 122 has a majority of the tape 116 wrapped around it—including all of zone 248 (FIG. 4A) and a portion of zone 246 (FIG. 4A). In the more general case of serially accessible media logically divided into two portions, this state is also known as a first half portion biased state. FIG. 3B shows a supply biased state of cartridge 112, where the supply reel 113 has a majority of the tape 116 wrapped around it —including all of zone 246 (FIG. 4A) and a portion of zone 248 (FIG. 4A). In the more general case of serially accessible media logically divided into two portions, this state is also known as a second half portion biased state. Again, the assumption here is that the original data and the duplicate data are maintained on the same cartridge, but in different zones. Because the tape may be subsequently accessed (for example, by a different computer or process, and regarding different data) after writing the original and duplicate data onto the cartridge, the head access point will likely be different than it was at the completion of writing the original/duplicate data. So, the cartridge may be in an unknown state (e.g. take-up biased state, supply biased state) when a request is received to access (e.g. read or write) original data. Upon receipt of such request, a determination is made as to which copy of the data will have the lowest latency—either the original copy or a duplicate copy—and that data copy is used to satisfy the data access request.

Figure 4B:
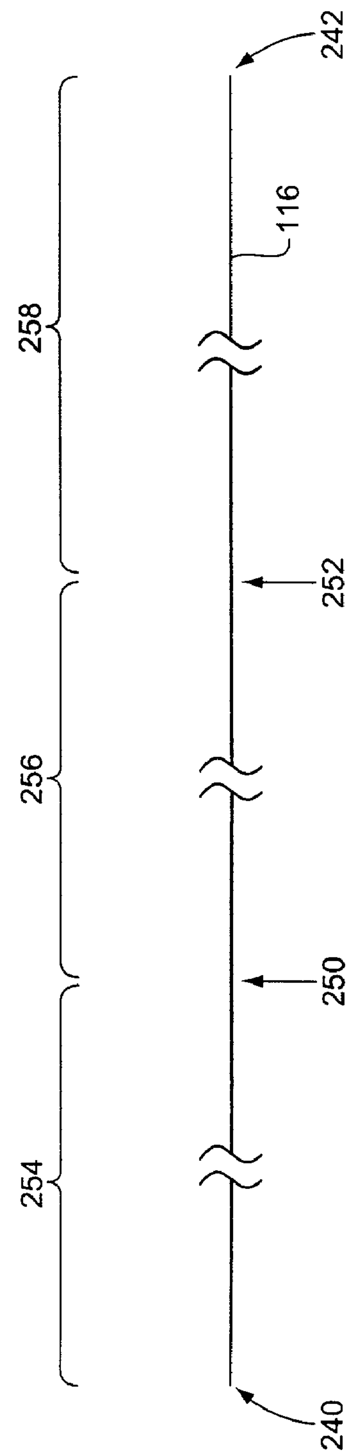
FIG. 4B is a drawing illustrating a three zone tape configuration.

By extension, any number of intermediate portions between the first end and the second end can be defined, thus partitioning the tape into any number of different zones to accommodate the situation where a plurality of duplicate copies of data are to be copied onto the tape. For example, a three zoned (254, 256, 258) tape for accommodating a system that maintains an original copy and two duplicate copies of data is shown in FIG. 4B. As will be later shown, increasing the number of zones decreases the average access latency.

The technique for determining which copy of data has the lowest latency will now be described. Referring to FIG. 5A, a conceptual view of a serially accessible media is shown. This is a representative view only, as the media is generally much longer and has many more data blocks than those shown at 301. Dotted line 300 represents the midpoint of the tape which logical divides the tape into zones 246 and 248. Original data D1 has been written in zone 246 at data block offset 1 (shown at element 301-1) upon receipt of a request to write such data, and duplicate data has been written in zone 248 at data block offset 1 (shown at element 401-1). In this example, D1 and DA have been written at the same block offset from the beginning of each respective zone, which is done for ease of system management. However, there is no fundamental requirement that this in fact be the case in practicing the present invention, as the duplicate data can be at differing offset locations within the other zone. How this might be accomplished will be shown below, where the data block access time calculations are described.

Head access point (HAP) 302 is the tape location that will be adjacent to or in contact with the transducer when the tape is first loaded into a tape drive. For example, FIG. 3B shows head access point 302 of tape 116, which is the location of the tape across from head access aperture 100 when cartridge 112 is first loaded (i.e. has not yet been advanced or rewound) into a tape drive. Returning to FIG. 5A, it can be seen that the time to access the original D1 data (access time #1) is shorter than the time to access the duplicate data DA (access time #2), since the head access point is nearer to D1 than it is to DA. So in this instance, original data D1 is chosen as the copy of data to access in satisfying a data I/O request.

Referring now to FIG. 5B, the head access point 302 in this example is considerably closer to the duplicate data DA, as both the head access point and DA are relatively near the middle of the tape shown as 300. So in this instance, duplicate data DA is chosen as the copy of data to access.

In FIG. 5C, the head access point is to the right of duplicate data DA, so it can be seen that the time to access DA (access time #2) would always be less than the time to access D1 (access time #1), so in this situation duplicate data DA is chosen as the copy of data to access. Although not shown in a figure, but by analogy to FIG. 5C, if the head access point were to the left of original data D1, D1 would be chosen as the copy of data to access in that situation.

Figure 5:
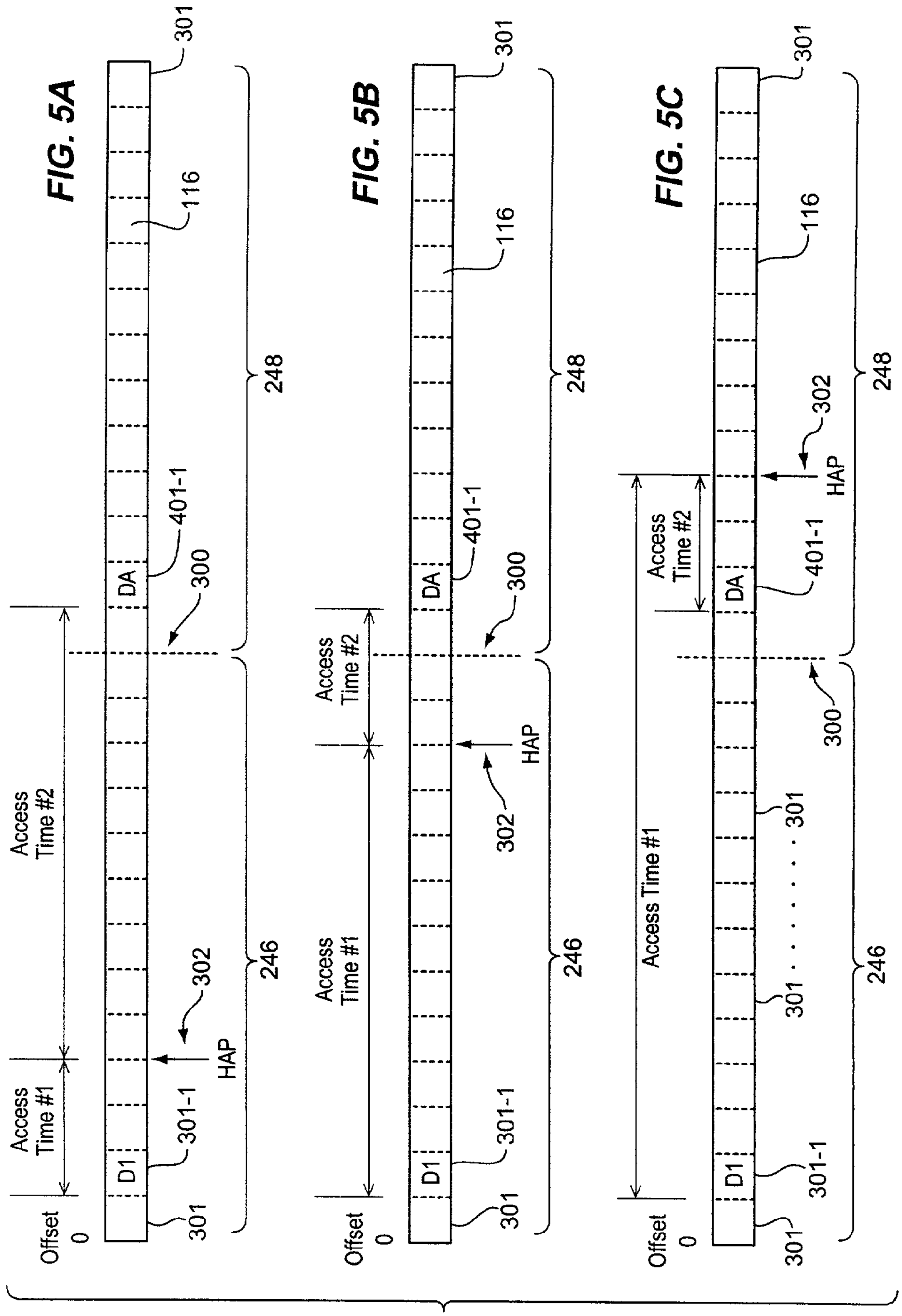
FIG. 5 (including FIGS. 5A, 5B and 5C) is a drawing illustrating various zones and data offsets for a linear tape.
Figures 5A, 6, 6B, 6C, 6D, 6E:
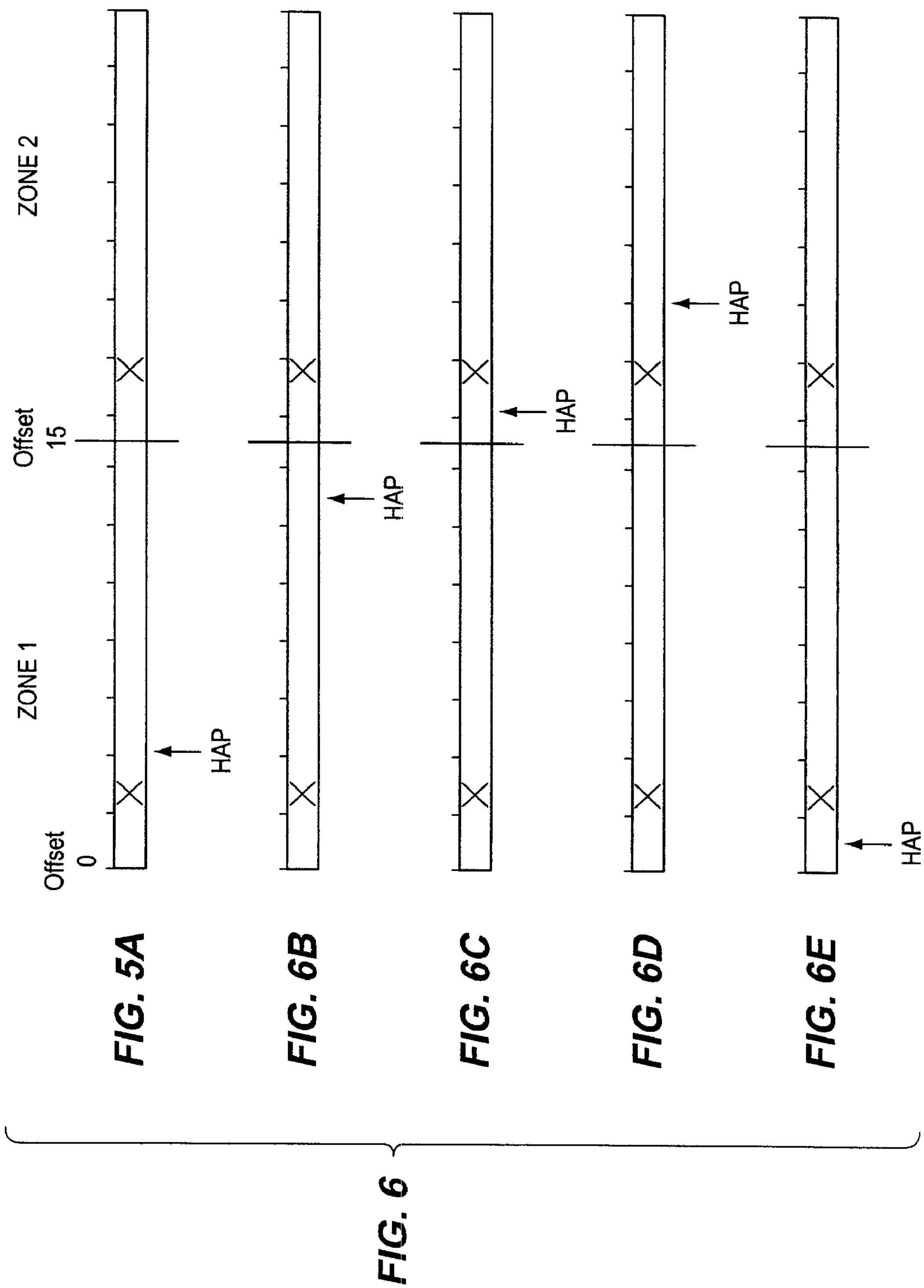
FIG. 6 is a drawing illustrating various access times for various head access points.

As can be seen by the examples shown in FIG. 5, two of the parameters needed to determine the access time for a given data block within a zone are the data block offset within a particular zone, and the zone offset locations within a given tape. For example, original data block D1 is shown at 301-1 to be at offset 1 within zone 246 (the first data block in a given zone being at offset 0 by definition). Similarly, duplicate data block DA is shown at 401-1 to be at offset 1 within zone 248. The relative access times for each data block capable of satisfying a data I/O request (either the original data block, or one of the duplicate data blocks) are calculated, and the smallest access time is then chosen.

For example, in FIG. 5A original data block D1 and duplicate data block DA are both capable of satisfying an I/O request for data block D1. So the relative access times for each of these data blocks is calculated, and the data block having the smallest access time of the two is chosen to be the data block to be used to satisfy the data I/O request. The access time for a given data block within a zone is calculated as follows:

|(head access point)−(zone offset+data offset w/in zone)|

For the example shown in FIG. 5A, with a head access point of 4, the zone and data offset values are shown in the following Table 1:

TABLE 1

| | D1 | DA |
|---|---|---|
| Zone Offset | 0 | 13 |
| Data offset w/in zone | 1 | 1 |

The access time for original data block D1 in FIG. 5A is thus:

D1 access time=|(head access point)−(zone offset+data offset w/in zone)|

=|(4)−(0−1)|

=3

The access time for duplicate data block DA in FIG. 5A is thus:

DA access time=|(head access point)−(zone offset+data offset w/in zone)|

=|(4)−(13+1)|

=16

In this case, original data block D1 would be chosen to satisfy the data I/O request for the scenario in FIG. 5A, since D1<DA.

For the example shown in FIG. 5B, with a head access point of 11, the access time for original data block D1 in FIG. 5B is thus:

D1 access time=|(head access point)−(zone offset+data offset w/in zone)|

=|(11)−(0+1)|

=10

The access time for duplicate data block DA in FIG. 5B is thus:

DA access time=|(head access point)−(zone offset+data offset w/in zone)|

=|(11)−(13+1)|

=3

In this case, duplicate data block DA would be chosen to satisfy the data I/O request for the scenario in FIG. 5B, since DA<D1.

For the example shown in FIG. 5C, with a head access point of 17, the access time for original data block D1 is thus:

D1 access time=|(head access point)−(zone offset+data offset w/in zone)|

=|(17)−(0+1)|

=16

The access time for duplicate data block DA in FIG. 5C is thus:

DA access time=|(head access point)−(zone offset+data offset w/in zone)|

=|(17)−(13+1)|

=3

In this case, duplicate data block DA would be chosen to satisfy the data I/O request for the scenario in FIG. 5C, since DA<D1.

FIG. 6 (including FIGS. 6A–6E) depicts other examples with a representative tape section of thirty (30) blocks divided into two zones. For the examples shown in FIG. 6, the zone and data offset values are shown in the following Table 2:

TABLE 2

| | D1 | DA |
|---|---|---|
| Zone Offset | 0 | 15 |
| Data offset w/in zone | 2 | 2 |

For FIG. 6A, with a HAP of 4, the D1 access is 2 and the DA access is 13, so the D1 data copy would be chosen to satisfy the data I/O request.

For FIG. 6B, with a HAP of 13, the D1 access is 11 and the DA access is 4, so the DA data copy would be chosen to satisfy the data I/O request.

For FIG. 6C, with a HAP of 16, the D1 access is 14 and the DA access is 1, so the DA data copy would be chosen to satisfy the data I/O request.

For FIG. 6D, with a HAP of 20, the D1 access is 18 and the DA access is 3, so the DA data would be chosen to satisfy the data I/O request.

For FIG. 6E, with a HAP of 1, the D1 access is 1 and the DA access is 16, so the D1 data would be chosen to satisfy the data I/O request.

Figure 7:
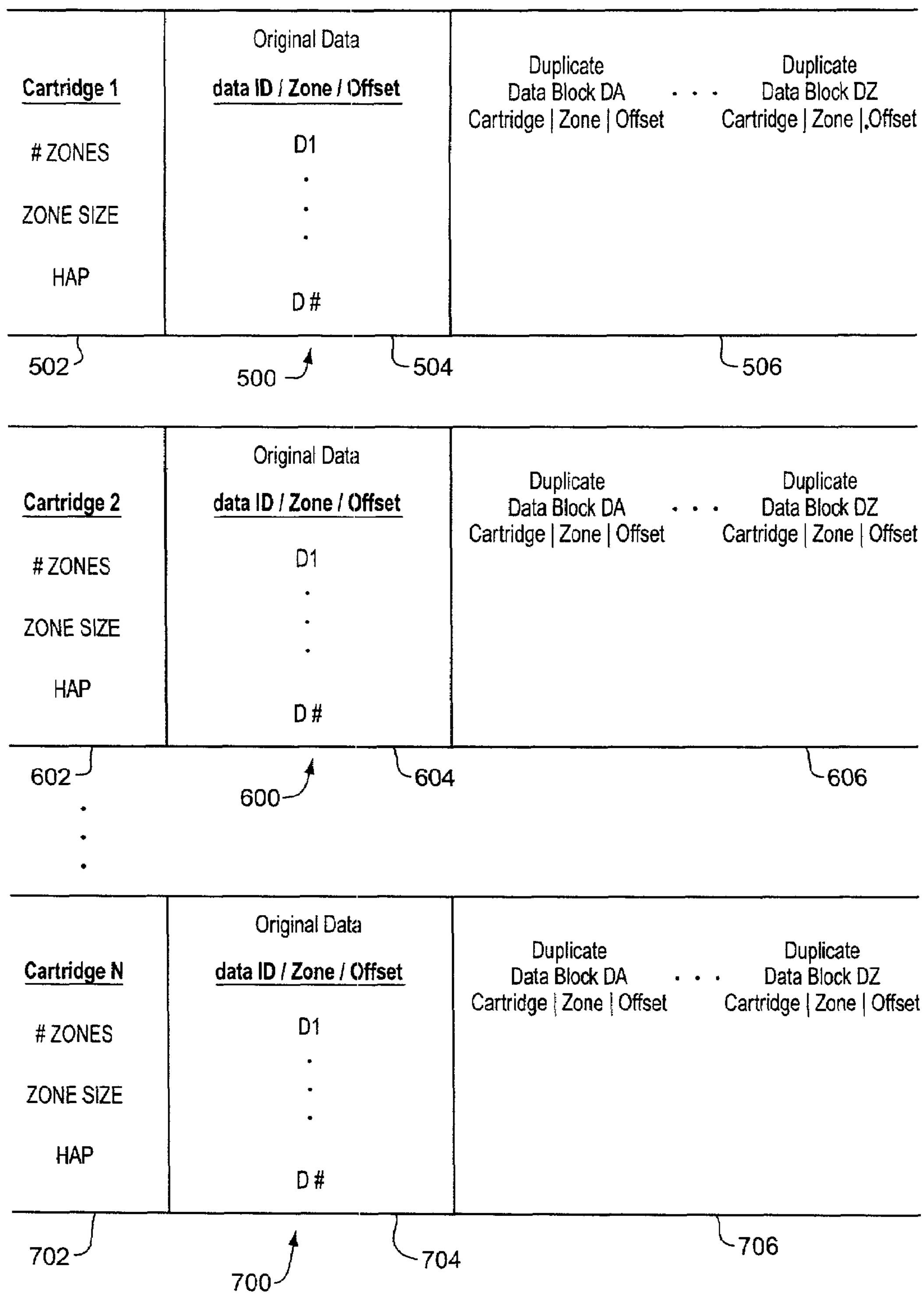
FIG. 7 is a drawing illustrating a data organization/layout used for determining cartridge selection.

FIG. 7 depicts the preferred embodiment of how to organize and track various parameters of the original and duplicate data, in order to facilitate the above described access time calculations. In the embodiment shown in FIG. 7, a set of information is maintained for each cartridge. Table 500 shows information maintained for cartridge 1, table 600 shows information for cartridge 2, and ending with table 700 with information for cartridge N. Additional tables (not shown) would be used for additional cartridges in the data library. The first field (502, 602, 702) in each respective table contains information that indicates the number (#) of zones defined for this particular cartridge, the size or offset of each zone (which may all be the same size, or may have differing sizes), and the current head access point (HAP) for this cartridge. The next field (504, 604, 704) in each respective table contains directory information as to where the particular original data items D1-D# are physically located on the tape. In the embodiment shown in FIG. 7, this directory information is maintained as zone and data offset information for each data item, identified by data ID, stored on the media. Fields 506, 606 and 706 contain information that identifies the location of the one or more duplicate data items (e.g. DA in FIG. 5) that are associated with the original data item (e.g. D1 in FIG. 5). For example, in field 506 there is specified the physical cartridge, zone and data offset for duplicate data A. This field also accommodates multiple duplicate copies of the data, indicated in the table as extending to duplicate data item Z and its associated physical location information. A set of one or more duplicate data items (DA–DZ) are maintained for each original data item D1–D#. The identification of the physical cartridge(s) in field 506 allows for storing the duplicate copy (ies) either on the same media, some on the same media and some on different media, or all on different media.

Typically, the determination of how many duplicate copies of data are to be maintained in a given tape system environment, and hence the number of zones that are needed to be established, are part of a system initialization or set-up process, and are not modified on a regular or frequent basis. Thus, the zone size/offset parameters tend to be somewhat static in value. However, the head access point value would typically change each time a cartridge completes a drive load/unload sequence. Because of the dynamic changing of this value, it is preferable to maintain the tables shown in FIG. 7 either in system memory, or in an alternate embodiment, in a non-volatile meta-label or meta-tag that is physically affixed to the media cartridge. Maintaining this metadata information in such meta-tag/meta-label reduces overall system memory requirements, as a table for each cartridge in the system would not have to be maintained in system memory, but rather only those tables for the cartridges that are currently being accessed. Such a meta-tag/meta-label system is described in U.S. Pat. Nos. 5,971,281 and 6,081,857, which are hereby incorporated by reference. This metadata that is maintained in a meta-tag/meta-label can then be easily accessed by a robot or robotic arm having an electromagnetic transducer, or alternatively the metadata can be transmitted to a controller via a wireless network.

Figure 8A:
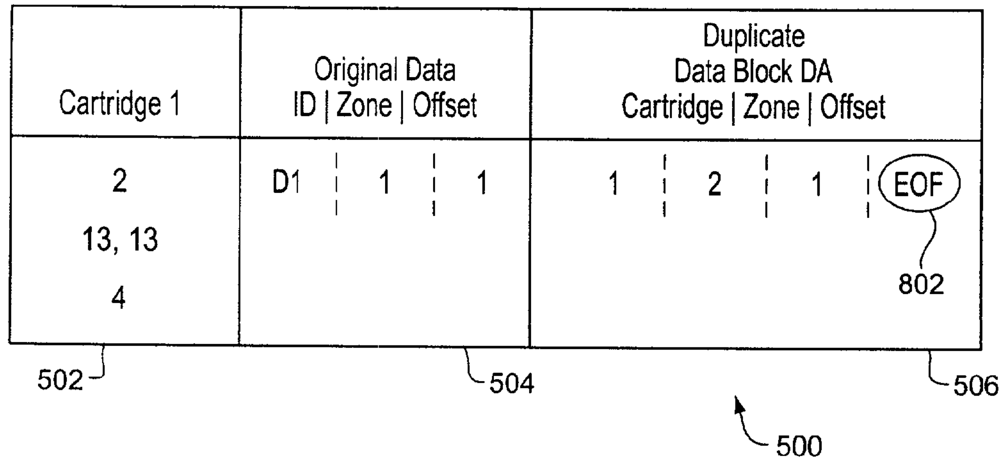
FIGS. 8A, 8B and 8C are drawings illustrating sample parameter tables.
Figure 8B:
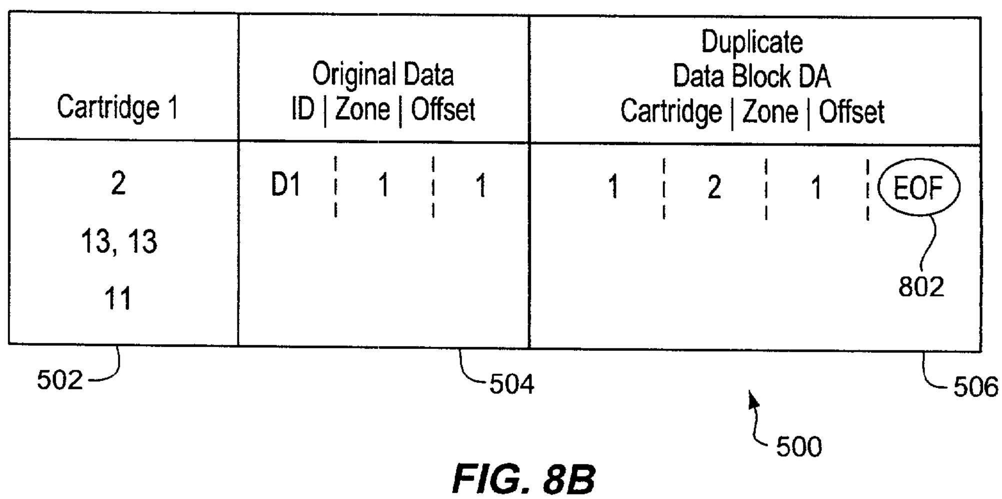
Figure 8C:
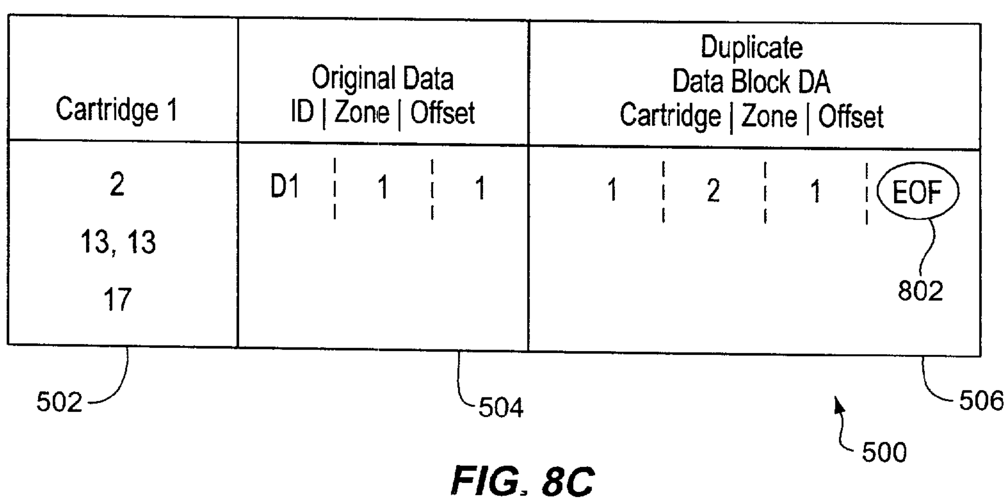

FIGS. 8A–8C show sample parameter tables 500 representative of each of the sample system states shown in FIGS. 5A–5C, respectively. Referring to FIG. 8A, it can be seen in field 502 that cartridge 1 has two zones, each having a size of 13. The current HAP is 4. Field 504 indicates that original data item having an ID of D1 is stored in zone 1 at data offset 1. Field 506 indicates that duplicate data item DA associated with D1 is stored in the same cartridge 1, in zone 2 at data offset 1. The end-of-field (EOF) 802 indicates that this is the end of the duplicate data list—in other words, there is only one duplicate data item for this particular data item. If there were other duplicate data copies, their locations would listed in succession before the EOF field. In similar fashion, other original data items on this cartridge would be included as entries in field 504, with their associated duplicate copies identified by corresponding entries in field 506. FIGS. 8B and 8C identify the tape state shown in FIGS. 5B and 5C, respectively, with the difference being different HAPs for cartridge 1. As previously discussed, the HAPs typically change each time a data cartridge is accessed by a tape drive.

As can be seen from the organization of the tables shown in FIG. 7, it is very convenient to scale this redundant system to maintain multiple duplicate copies of data—from duplicate blocks DA to DZ in the example shown. This allows the system to be configured to meet the particular needs of a given tape system, which is a key requirement for tape systems, because of the wide gamut of uses of tape—from a high speed access system which emulates a disk system using a combination of front-end cache and a back-end tape system, to a more traditional slow speed access tape system that provides off-line data backup of a disk system during off-hours.

Figure 9:
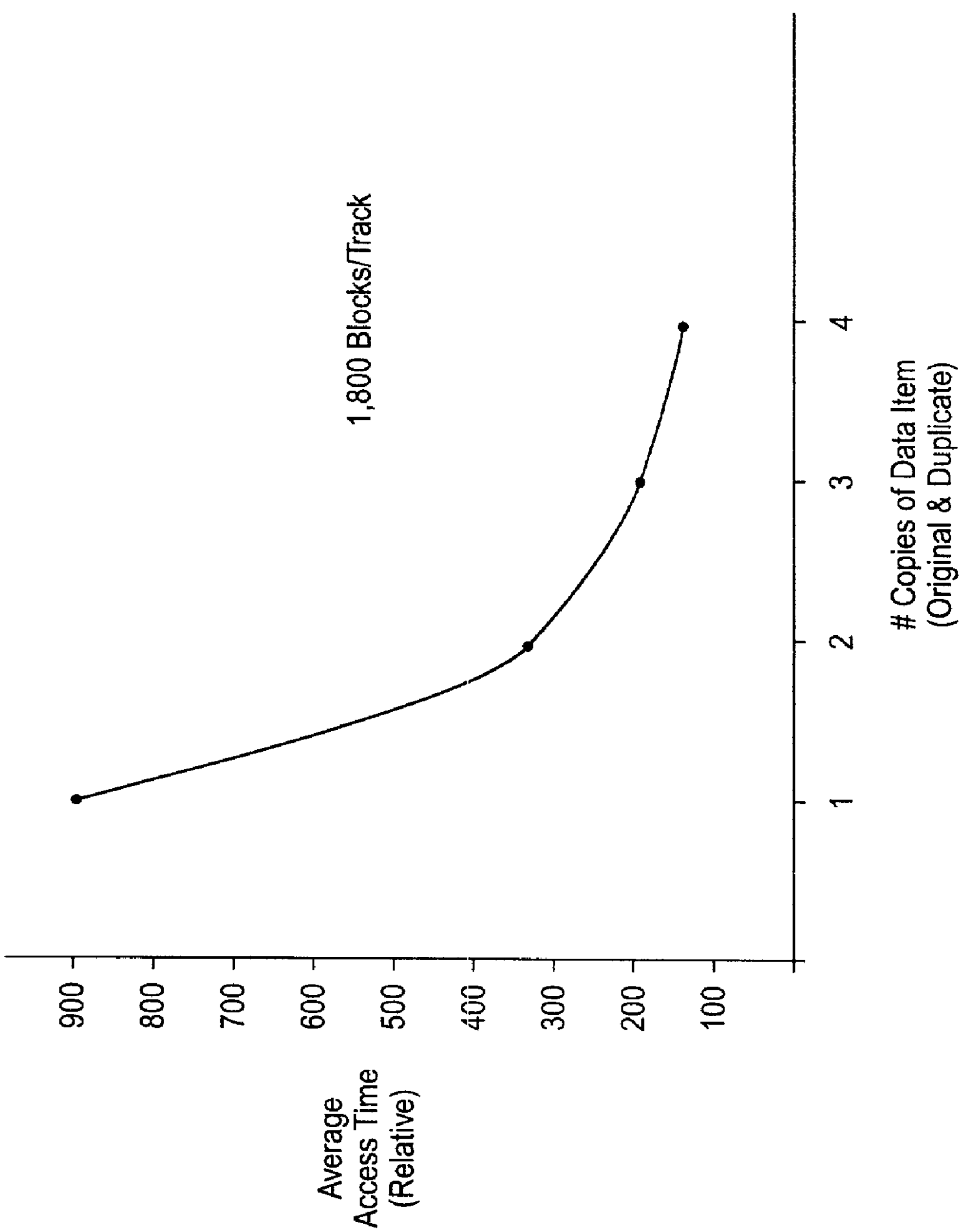
FIG. 9 is a graph depicting various calculated relative access times.

FIG. 9 is a graph depicting the calculated relative access times for a tape having from zero to three duplicate copies of an original data item. For these calculations, the tape was assumed to have 1,800 blocks/track (although tape typically has many more blocks/track), and each data offset for each data copy was assumed to be 2. For a single copy of data (i.e. one with no duplicate copy), the average number of blocks that would have to be traversed to reach the desired data item is 897. Thus, the average access time would be 897 units, with each unit being the amount of time to traverse a given block. For two copies of data (one original and one duplicate), the average access time is 336 units. For three copies of data (one original and two duplicate), the average access time is 199 units. For four copies of data (one original and three duplicate), the average access time is 140 units. Thus, it can be seen that increasing the number of duplicate copies results in a decrease in the average data access time or latency.

Tables 3-1 through 3-18 show the assumptions, data and calculated results used for generating the graph shown in FIG. 9. In particular, the tables show the relative access times for various copies of data (original and duplicate), and the access time for the selected copy having the lowest access time, for various HAP values. It should be noted that not every HAP table entry for a given table is shown, as various data patterns become self-evident without requiring each HAP entry to be shown.

Tables 3-1 through 3-4 show various parameters of a two (2) zone layout with 1800 blocks/track. The D1 Zone Offset is 0, and the DA zone offset is in the middle of the tape at offset 900. The D1 Data offset is at 2 (within zone D1), and the DA data offset is at 2 (within zone DA). The tables shows which copy of data is selected for various head access points (HAP) in this two zone layout. As can be seen in Table 3-1, which shows HAP 0 through HAP 46, the D1 copy of data is selected as it has the smallest access time. Table 3-2 shows HAP 407 through HAP 466, and also shows the transition point (which is circled) where the DA copy of data begins to be selected for HAP greater than 452. Table 3-3 shows that the DA copy of data continues to be selected, and also shows the instance where the HAP 902 coincides with the DA data copy (i.e. where the DA access time is zero, as shown by the table entry highlighted by arrows). Table 3-4 shows HAP 1787 through 1799, where the DA copy of data continues to be selected. It can be seen that the average access time for the selected data is 336.25 units of time, which is less than one half the average access time if only copy D1 where selected (i.e. not taking advantage of selecting the duplicate copy).

Tables 3-5 through 3-9 show various parameters of a three (3) zone layout with 1800 blocks/track. The D1 Zone Offset is 0, the DA zone offset is ⅓ of the way from the beginning of the tape at offset 600, and the DB zone offset is ⅔ of the way from the beginning of the tape at offset 1200. The D1 Data offset is at 2 (within zone D1), the DA data offset is at 2 (within zone DA), and the DB data offset is at 2 (within zone DB). These tables show which copy of data is selected for various head access points (HAP) in this three zone layout. As can be seen in Table 3-5, which shows HAP 0 through HAP 48, the D1 copy of data is selected as it has the smallest access time. Table 3-6 shows HAP 289 through HAP 348, and also shows the transition point (which is circled) where the DA copy of data begins to be selected for HAP greater than 302. Table 3–7 shows that the DA copy of data continues to be selected, and also shows the instance where the HAP 602 coincides with the DA data copy (i.e. where the DA access time is zero, as shown by the table entry highlighted by arrows). Table 3-8 shows HAP 889 through HAP 948, and also shows the transition point (which is circled) where the DB copy of data begins to be selected for HAP greater than 902. Table 3-9 shows that the DB copy of data continues to be selected, and also shows the instance where the HAP 1202 coincides with the DB data copy (i.e. where the DB access time is zero, as shown by the table entry highlighted by arrows). Table 3-10 shows HAP 1789 through 1799, where the DB copy of data continues to be selected. It can be seen that the average access time for the selected data is 199.17 units of time, which is less than one quarter the average access time if only copy D1 where selected (i.e. not taking advantage of selecting the duplicate copy).

Tables 3-11 through 3-18 show various parameters of a four (4) zone layout with 1800 blocks/track. The D1 Zone Offset is 0, the DA zone offset is ¼ of the way from the beginning of the tape at offset 450, the DB zone offset is ½ of the way from the beginning of the tape at offset 900, and the DC zone offset is 1 of the way from the beginning of the tape at offset 1350. The D1 Data offset is at 2 (within zone D1), the DA data offset is at 2 (within zone DA), the DB data offset is at 2 (within zone DB), and the DC data offset is at 2 (within zone DC). These tables show which copy of data is selected for various head access points (HAP) in this four zone layout. As can be seen in Table 3-11, which shows HAP 0 through HAP 48, the D1 copy of data is selected as it has the smallest access time. Table 3-12 shows HAP 169 through HAP 228, and also shows the transition point (which is circled) where the DA copy of data begins to be selected for HAP greater than 227. Table 3-13 shows that the DA copy of data continues to be selected, and also shows the instance where the HAP 452 coincides with the DA data copy (i.e. where the DA access time is zero, as shown by the table entry highlighted by arrows). Table 3-14 shows HAP 649 through HAP 708, and also shows the transition point (which is circled) where the DB copy of data begins to be selected for HAP greater than 677. Table 3-15 shows that the DB copy of data continues to be selected, and also shows the instance where the HAP 902 coincides with the DB data copy (i.e. where the DB access time is zero, as shown by the table entry highlighted by arrows). Table 3-16 shows HAP 1069 through HAP 1128, and also shows the transition point (which is circled) where the DC copy of data begins to be selected for HAP greater than 1127. Table 3-17 shows that the DC copy of data continues to be selected, and also shows the instance where the HAP 1352 coincides with the DC data copy (i.e. where the DC access time is zero, as shown by the table entry highlighted by arrows). Table 3-18 shows HAP 1789 through 1799, where the DC copy of data continues to be selected. It can be seen that the average access time for the selected data is 140.00 units of time, which is less than one sixth the average access time if only copy D1 where selected (i.e. not taking advantage of selecting the duplicate copy).

The previous analysis was based upon random HAPs, where the tape is left in its final position after completion of a tape access operation. It may be desirable to pre-bias to either a supply-reel biased state or a take-up reel biased state after completion of a previous tape access operation, such that the media is maintained in a known state. This would allow for further reductions in data access times. In such a system, the duplicate copy of data is stored on a different cartridge, but not necessarily in a different zone. Instead, the differing cartridges are maintained in different biased states after a previous I/O access, such as writing original and duplicate data. Then, upon receipt of a subsequent I/O request, the cartridge containing the data with the lowest latency is chosen. Again, refer to FIGS. 3A, 3B, 4A and 4B. In this scenario, FIG. 3A shows the cartridge containing the original data in zone 246 (see FIG. 4A), and FIG. 3B shows another cartridge 112 that contains a duplicate copy of the original data also in zone 246 (see FIG. 4A). In this type of system, the two cartridges are maintained to be in differing biased states upon completion of writing the original/duplicate data. The cartridge of FIG. 3A is either fast-forwarded or rewound to be in a take-up reel bias state prior to dismounting the cartridge from the tape drive (after writing the original data). Similarly, the cartridge of FIG. 3B is either fast-forwarded or rewound to be in a supply reel biased state prior to dismounting the cartridge from the tape drive (after writing the duplicate data). The HAP information for each cartridge is then updated to reflect the new HAP resulting from this pre-bias operation. Then, upon a subsequent request to access the original data, either the take-up reel biased cartridge in FIG. 3A or the supply reel biased cartridge in FIG. 3B is chosen depending upon which has the lowest latency, using the calculation techniques previously described.

Figure 10:
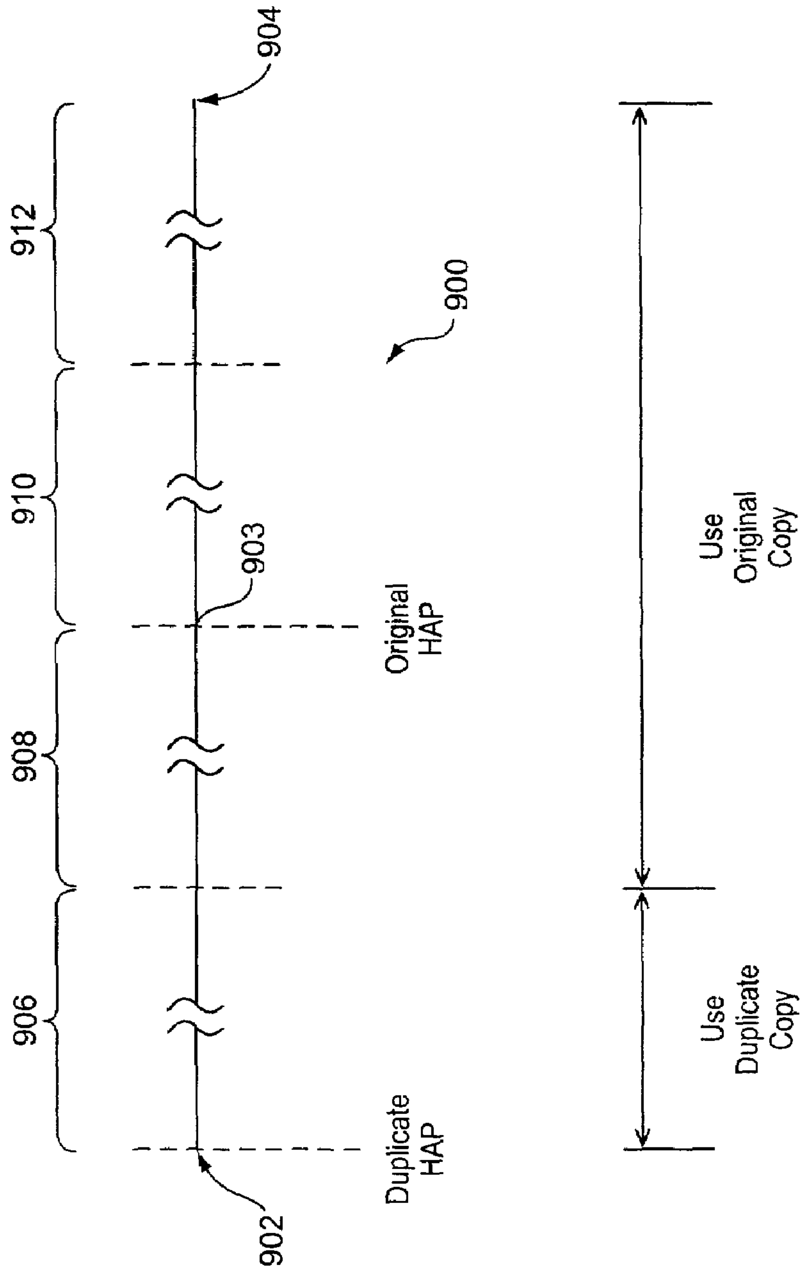
FIG. 10 is a drawing illustrating a four zone layout used with biasing of cartridges/cassettes.

As one example, assume that the supply reel biased state is defined to be that all tape is on the supply reel—i.e. it is fully rewind after completion of access by a tape drive. This reel will be used to store the duplicate copy of the data item. The take-up reel biased state is defined to be that the tape is positioned to be half on the take-up reel and half on the supply reel (as shown in FIG. 2A). This reel will be used to store the original copy of the data item. For this example, it is assumed that the duplicate copy of data is stored at the same offset location as the original data item, but obviously on a different cartridge. In effect, the duplicate data cartridge is a mirror image of the original data cartridge. Prior to dismounting the cartridges, they are pre-biased as previously described. Upon a subsequent data access request for original data, a determination is made as to the location, or offset, of where this data item resides. The cartridge containing the data with the lowest latency is chosen, using the calculation techniques previously described. FIG. 10 conceptually shows the resultant copy selection, tape 900 can be thought of as being logically divided into four logical zones 906, 908, 910 and 912 of equal size. For data items having a starting location in any of zones 908, 910 and 912, the take-up reel biased cartridge having a head access point (HAP) at the tape midpoint 903 is chosen for data access, as it will have the lowest latency. For data items having a starting location in zone 906, the supply reel biased cartridge having a head access point (HAP) at the tape beginning 902 is chosen for data access, as it will have the lowest latency.

Figure 11:
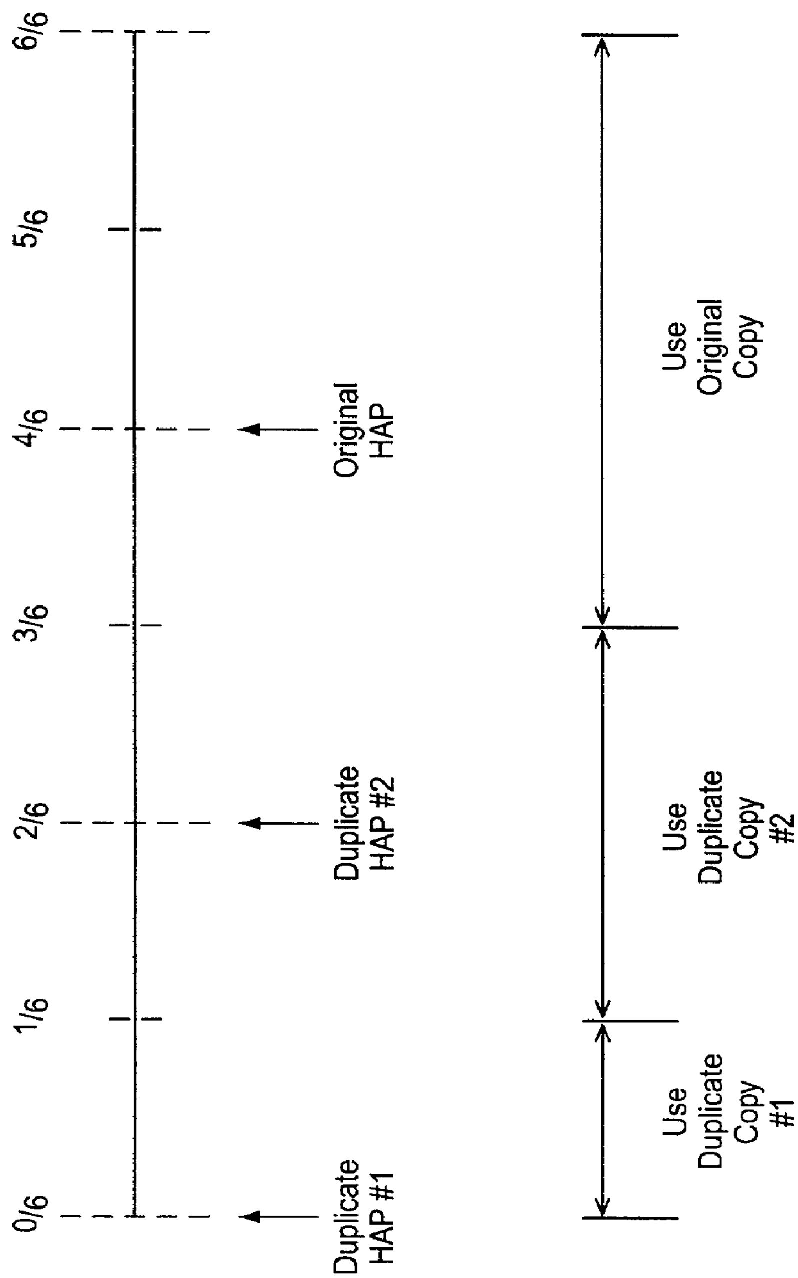
FIG. 11 is a drawing illustrating a biasing scheme extended to N cartridges.

Maintaining cartridges with biased load points can be extended to more than two cartridges. For example, a three cartridge system such as that shown in FIG. 11 could be maintained, with a HAP biased (1) at the beginning of the tape for the first duplicate cartridge, (2) ⅓ of the tape length from the tape beginning for the second duplicate cartridge, and (3) ⅔ of the tape length for the cartridge containing the original data. The cartridge containing duplicate copy #1 would be used to access a data item beginning on the first ⅙ of the tape. The cartridge containing duplicate copy #2 would be used to access a data item beginning between ⅙ and 3/6 of the tape length. The cartridge containing the original copy would be used to access a data item beginning between 3/6 and 6/6 (i.e. the end) of the tape length.

In an alternate embodiment, a race situation is created where at least some of the plurality of media having a copy of the selected data are loaded into respective media drives, and the drive that is first to access the copy of the data provides such data to the requester. In this embodiment, it is preferable to store the duplicate copies of data in different zones on the respective media. A request is received from a requester to read data. A determination is made as to which of a plurality of serially accessible media contain a copy of the requested data. Some or all of media containing a copy of the requested data are loaded into respective media drives. The drives to seek to the copy of the data on their respective media, and the data copy is read. The media drive that is first to access the requested data is used to provide the data to the requestor.

Figure 12:
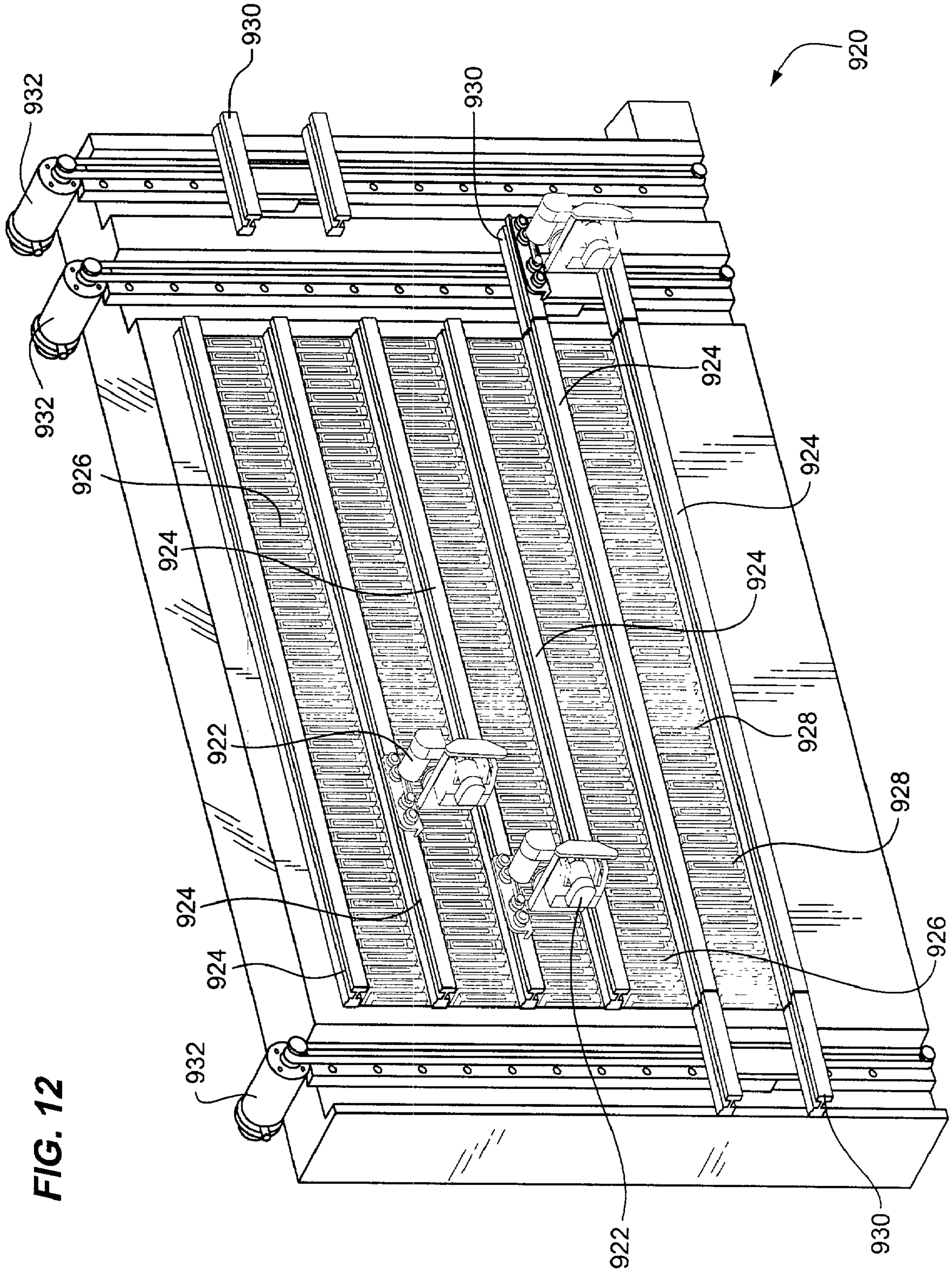
FIG. 12 is a drawing illustrating a media library system.

The invention described herein is particularly useful when used in a media library system comprising a plurality of tape drives and media cells. Such a system, as shown at 920 in FIG. 12, advantageously provides numerous cells 926 for holding the increased number of cartridges that may be required to maintain the duplicate copies of data. Such a system also advantageously provides a plurality of media drives 928 that allow concurrent access to a plurality of serially accessible media. The cells 926 and media drives 928 are accessible by a plurality of robots 922 traveling along guides or rails 924. The robots can travel from one row of cells to another, or to a row of media drives, via one or more elevators 930 driven by motors 932. This library system thus allows for data access operations occurring on a first drive and its associated loaded media to overlap either partially or entirely with data access operations of a second drive and its associated loaded media.

Finally, it should be noted that the one or more duplicate copies of data that are maintained to reduce data latency are also available as a redundant copy of data that be can used in lieu of the original data in the event of data loss in the original data, borrowing from techniques used in a traditional data restoration operation.

TABLE 3-1

| Duplicate Offsets within Zones - 1800 Blocks/Track | | | |
|---|---|---|---|
| Assumption #1: 1800 blocks/track 2 Zones | | | |
| D1 Zone Offset | | DA Zone Offset | |
| 0 | | 900 | |
| D1 Data Offset | | DA Data Offset | |
| 2 | | 2 | |
| HAP | D1 Access Time | DA Access Time | Selected Access Time |
| 0 | 2 | 902 | 2 |
| 1 | 1 | 901 | 1 |
| 2 | 0 | 900 | 0 |
| 3 | 1 | 899 | 1 |
| 4 | 2 | 898 | 2 |
| 5 | 3 | 897 | 3 |
| 6 | 4 | 896 | 4 |
| 7 | 5 | 895 | 5 |
| 8 | 6 | 894 | 6 |
| 9 | 7 | 893 | 7 |
| 10 | 8 | 892 | 8 |
| 11 | 9 | 891 | 9 |
| 12 | 10 | 890 | 10 |
| 13 | 11 | 889 | 11 |
| 14 | 12 | 888 | 12 |
| 15 | 13 | 887 | 13 |
| 16 | 14 | 886 | 14 |
| 17 | 15 | 885 | 15 |
| 18 | 16 | 884 | 16 |
| 19 | 17 | 883 | 17 |
| 20 | 18 | 882 | 18 |
| 21 | 19 | 881 | 19 |
| 22 | 20 | 880 | 20 |
| 23 | 21 | 879 | 21 |
| 24 | 22 | 878 | 22 |
| 25 | 23 | 877 | 23 |
| 26 | 24 | 876 | 24 |
| 27 | 25 | 875 | 25 |
| 28 | 26 | 874 | 26 |
| 29 | 27 | 873 | 27 |
| 30 | 28 | 872 | 28 |
| 31 | 29 | 871 | 29 |
| 32 | 30 | 870 | 30 |
| 33 | 31 | 869 | 31 |
| 34 | 32 | 868 | 32 |
| 35 | 33 | 867 | 33 |
| 36 | 34 | 866 | 34 |
| 37 | 35 | 865 | 35 |
| 38 | 36 | 864 | 36 |
| 39 | 37 | 863 | 37 |
| 40 | 38 | 862 | 38 |
| 41 | 39 | 861 | 39 |
| 42 | 40 | 860 | 40 |
| 43 | 41 | 859 | 41 |
| 44 | 42 | 858 | 42 |
| 45 | 43 | 857 | 43 |
| 46 | 44 | 856 | 44 |

TABLE 3-2

| HAP | D1 Access Time | DA Access Time | Selected Access Time |
|---|---|---|---|
| 407 | 405 | 495 | 405 |
| 408 | 406 | 494 | 406 |
| 409 | 407 | 493 | 407 |
| 410 | 408 | 492 | 408 |
| 411 | 409 | 491 | 409 |
| 412 | 410 | 490 | 410 |
| 413 | 411 | 489 | 411 |
| 414 | 412 | 488 | 412 |
| 415 | 413 | 487 | 413 |
| 416 | 414 | 486 | 414 |
| 417 | 415 | 485 | 415 |
| 418 | 416 | 484 | 416 |
| 419 | 417 | 483 | 417 |
| 420 | 418 | 482 | 418 |
| 421 | 419 | 481 | 419 |
| 422 | 420 | 480 | 420 |
| 423 | 421 | 479 | 421 |
| 424 | 422 | 478 | 422 |
| 425 | 423 | 477 | 423 |
| 426 | 424 | 476 | 424 |
| 427 | 425 | 475 | 425 |
| 428 | 426 | 474 | 426 |
| 429 | 427 | 473 | 427 |
| 430 | 428 | 472 | 428 |
| 431 | 429 | 471 | 429 |
| 432 | 430 | 470 | 430 |
| 433 | 431 | 469 | 431 |
| 434 | 432 | 468 | 432 |
| 435 | 433 | 467 | 433 |
| 436 | 434 | 466 | 434 |
| 437 | 435 | 465 | 435 |
| 438 | 436 | 464 | 436 |
| 439 | 437 | 463 | 437 |
| 440 | 438 | 462 | 438 |
| 441 | 439 | 461 | 439 |
| 442 | 440 | 460 | 440 |
| 443 | 441 | 459 | 441 |
| 444 | 442 | 458 | 442 |
| 445 | 443 | 457 | 443 |
| 446 | 444 | 456 | 444 |
| 447 | 445 | 455 | 445 |
| 448 | 446 | 454 | 446 |
| 449 | 447 | 453 | 447 |
| 450 | 448 | 452 | 448 |
| 451 | 449 | 451 | 449 |
| 452 | 450 | 450 | 450 |
| 453 | 451 | 449 | 449 |
| 454 | 452 | 448 | 448 |
| 455 | 453 | 447 | 447 |
| 456 | 454 | 446 | 446 |
| 457 | 455 | 445 | 445 |
| 458 | 456 | 444 | 444 |
| 459 | 457 | 443 | 443 |
| 460 | 458 | 442 | 442 |
| 461 | 459 | 441 | 441 |
| 462 | 460 | 440 | 440 |
| 463 | 461 | 439 | 439 |
| 464 | 462 | 438 | 438 |
| 465 | 463 | 437 | 437 |
| 466 | 464 | 436 | 436 |

TABLE 3-3

| HAP | D1 Access Time | DA Access Time | Selected Access Time |
|---|---|---|---|
| 887 | 885 | 15 | 15 |
| 888 | 886 | 14 | 14 |
| 889 | 887 | 13 | 13 |
| 890 | 888 | 12 | 12 |
| 891 | 889 | 11 | 11 |
| 892 | 890 | 10 | 10 |
| 893 | 891 | 9 | 9 |
| 894 | 892 | 8 | 8 |
| 895 | 893 | 7 | 7 |
| 896 | 894 | 6 | 6 |
| 897 | 895 | 5 | 5 |
| 898 | 896 | 4 | 4 |
| 899 | 897 | 3 | 3 |
| 900 | 898 | 2 | 2 |
| 901 | 899 | 1 | 1 |

TABLE 3-3-continued

| HAP | D1 Access Time | DA Access Time | Selected Access Time |
|---|---|---|---|
| →902 | 900 | 0 | 0← |
| 903 | 901 | 1 | 1 |
| 904 | 902 | 2 | 2 |
| 905 | 903 | 3 | 3 |
| 906 | 904 | 4 | 4 |
| 907 | 905 | 5 | 5 |
| 908 | 906 | 6 | 6 |
| 909 | 907 | 7 | 7 |
| 910 | 908 | 8 | 8 |
| 911 | 909 | 9 | 9 |
| 912 | 910 | 10 | 10 |
| 913 | 911 | 11 | 11 |
| 914 | 912 | 12 | 12 |
| 915 | 913 | 13 | 13 |
| 916 | 914 | 14 | 14 |
| 917 | 915 | 15 | 15 |
| 918 | 916 | 16 | 16 |
| 919 | 917 | 17 | 17 |
| 920 | 918 | 18 | 18 |
| 921 | 919 | 19 | 19 |
| 922 | 920 | 20 | 20 |
| 923 | 921 | 21 | 21 |
| 924 | 922 | 22 | 22 |
| 925 | 923 | 23 | 23 |
| 926 | 924 | 24 | 24 |
| 927 | 925 | 25 | 25 |
| 928 | 926 | 26 | 26 |
| 929 | 927 | 27 | 27 |
| 930 | 928 | 28 | 28 |
| 931 | 929 | 29 | 29 |
| 932 | 930 | 30 | 30 |
| 933 | 931 | 31 | 31 |
| 934 | 932 | 32 | 32 |
| 935 | 933 | 33 | 33 |
| 936 | 934 | 34 | 34 |
| 937 | 935 | 35 | 35 |
| 938 | 936 | 36 | 36 |
| 939 | 937 | 37 | 37 |
| 940 | 938 | 38 | 38 |
| 941 | 939 | 39 | 39 |
| 942 | 940 | 40 | 40 |
| 943 | 941 | 41 | 41 |
| 944 | 942 | 42 | 42 |
| 945 | 943 | 43 | 43 |
| 946 | 944 | 44 | 44 |

TABLE 3-4

| HAP | D1 Access Time | DA Access Time | Selected Access Time |
|---|---|---|---|
| 1787 | 1785 | 885 | 885 |
| 1788 | 1786 | 886 | 886 |
| 1789 | 1787 | 887 | 887 |
| 1790 | 1788 | 888 | 888 |
| 1791 | 1789 | 889 | 889 |
| 1792 | 1790 | 890 | 890 |
| 1793 | 1791 | 891 | 891 |
| 1794 | 1792 | 892 | 892 |
| 1795 | 1793 | 893 | 893 |
| 1796 | 1794 | 894 | 894 |
| 1797 | 1795 | 895 | 895 |
| 1798 | 1796 | 896 | 896 |
| 1799 | 1797 | 897 | 897 |
| Average Access Time | 897.50 | 450.00 | 336.25 |

TABLE 3-5

| Assumption #2: 1800 blocks/track 3 Zones | | |
|---|---|---|
| D1 Zone Offset | DA Zone Offset | DB Zone Offset |
| 0 | 600 | 1200 |
| D1 Data Offset | DA Data Offset | DB Data Offset |
| 2 | 2 | 2 |

| HAP | D1 Access Time | DA Access Time | DB Access Time | Selected Access Time |
|---|---|---|---|---|
| 0 | 2 | 602 | 1202 | 2 |
| 1 | 1 | 601 | 1201 | 1 |
| 2 | 0 | 600 | 1200 | 0 |
| 3 | 1 | 599 | 1199 | 1 |
| 4 | 2 | 598 | 1198 | 2 |
| 5 | 3 | 597 | 1197 | 3 |
| 6 | 4 | 596 | 1196 | 4 |
| 7 | 5 | 595 | 1195 | 5 |
| 8 | 6 | 594 | 1194 | 6 |
| 9 | 7 | 593 | 1193 | 7 |
| 10 | 8 | 592 | 1192 | 8 |
| 11 | 9 | 591 | 1191 | 9 |
| 12 | 10 | 590 | 1190 | 10 |
| 13 | 11 | 589 | 1189 | 11 |
| 14 | 12 | 588 | 1188 | 12 |
| 15 | 13 | 587 | 1187 | 13 |
| 16 | 14 | 586 | 1186 | 14 |
| 17 | 15 | 585 | 1185 | 15 |
| 18 | 16 | 584 | 1184 | 16 |
| 19 | 17 | 583 | 1183 | 17 |
| 20 | 18 | 582 | 1182 | 18 |
| 21 | 19 | 581 | 1181 | 19 |
| 22 | 20 | 580 | 1180 | 20 |
| 23 | 21 | 579 | 1179 | 21 |
| 24 | 22 | 578 | 1178 | 22 |
| 25 | 23 | 577 | 1177 | 23 |
| 26 | 24 | 576 | 1176 | 24 |
| 27 | 25 | 575 | 1175 | 25 |
| 28 | 26 | 574 | 1174 | 26 |
| 29 | 27 | 573 | 1173 | 27 |
| 30 | 28 | 572 | 1172 | 28 |
| 31 | 29 | 571 | 1171 | 29 |
| 32 | 30 | 570 | 1170 | 30 |
| 33 | 31 | 569 | 1169 | 31 |
| 34 | 32 | 568 | 1168 | 32 |
| 35 | 33 | 567 | 1167 | 33 |
| 36 | 34 | 566 | 1166 | 34 |
| 37 | 35 | 565 | 1165 | 35 |
| 38 | 36 | 564 | 1164 | 36 |
| 39 | 37 | 563 | 1163 | 37 |
| 40 | 38 | 562 | 1162 | 38 |
| 41 | 39 | 561 | 1161 | 39 |
| 42 | 40 | 560 | 1160 | 40 |
| 43 | 41 | 559 | 1159 | 41 |
| 44 | 42 | 558 | 1158 | 42 |
| 45 | 43 | 557 | 1157 | 43 |
| 46 | 44 | 556 | 1156 | 44 |
| 47 | 45 | 555 | 1155 | 45 |
| 48 | 46 | 554 | 1154 | 46 |

TABLE 3-6

| HAP | D1 Access Time | DA Access Time | DB Access Time | Selected Access Time |
|---|---|---|---|---|
| 289 | 287 | 313 | 913 | 287 |
| 290 | 288 | 312 | 912 | 288 |
| 291 | 289 | 311 | 911 | 289 |
| 292 | 290 | 310 | 910 | 290 |
| 293 | 291 | 309 | 909 | 291 |
| 294 | 292 | 308 | 908 | 292 |
| 295 | 293 | 307 | 907 | 293 |

TABLE 3-6-continued

| HAP | D1 Access Time | DA Access Time | DB Access Time | Selected Access Time |
|---|---|---|---|---|
| 296 | 294 | 306 | 906 | 294 |
| 297 | 295 | 305 | 905 | 295 |
| 298 | 296 | 304 | 904 | 296 |
| 299 | 297 | 303 | 903 | 297 |
| 300 | 298 | 302 | 902 | 298 |
| 301 | 299 | 301 | 901 | 299 |
| 302 | 300 | 300 | 900 | 300 |
| 303 | 301 | 299 | 899 | 299 |
| 304 | 302 | 298 | 898 | 298 |
| 305 | 303 | 297 | 897 | 297 |
| 306 | 304 | 296 | 896 | 296 |
| 307 | 305 | 295 | 895 | 295 |
| 308 | 306 | 294 | 894 | 294 |
| 309 | 307 | 293 | 893 | 293 |
| 310 | 308 | 292 | 892 | 292 |
| 311 | 309 | 291 | 891 | 291 |
| 312 | 310 | 290 | 890 | 290 |
| 313 | 311 | 289 | 889 | 289 |
| 314 | 312 | 288 | 888 | 288 |
| 315 | 313 | 287 | 887 | 287 |
| 316 | 314 | 286 | 886 | 286 |
| 317 | 315 | 285 | 885 | 285 |
| 318 | 316 | 284 | 884 | 284 |
| 319 | 317 | 283 | 883 | 283 |
| 320 | 318 | 282 | 882 | 282 |
| 321 | 319 | 281 | 881 | 281 |
| 322 | 320 | 280 | 880 | 280 |
| 323 | 321 | 279 | 879 | 279 |
| 324 | 322 | 278 | 878 | 278 |
| 325 | 323 | 277 | 877 | 277 |
| 326 | 324 | 276 | 876 | 276 |
| 327 | 325 | 275 | 875 | 275 |
| 328 | 326 | 274 | 874 | 274 |
| 329 | 327 | 273 | 873 | 273 |
| 330 | 328 | 272 | 872 | 272 |
| 331 | 329 | 271 | 871 | 271 |
| 332 | 330 | 270 | 870 | 270 |
| 333 | 331 | 269 | 869 | 269 |
| 334 | 332 | 268 | 868 | 268 |
| 335 | 333 | 267 | 867 | 267 |
| 336 | 334 | 266 | 866 | 266 |
| 337 | 335 | 265 | 865 | 265 |
| 338 | 336 | 264 | 864 | 264 |
| 339 | 337 | 263 | 863 | 263 |
| 340 | 338 | 262 | 862 | 262 |
| 341 | 339 | 261 | 861 | 261 |
| 342 | 340 | 260 | 860 | 260 |
| 343 | 341 | 259 | 859 | 259 |
| 344 | 342 | 258 | 858 | 258 |
| 345 | 343 | 257 | 857 | 257 |
| 346 | 344 | 256 | 856 | 256 |
| 347 | 345 | 255 | 855 | 255 |
| 348 | 346 | 254 | 854 | 254 |

TABLE 3-7

| HAP | D1 Access Time | DA Access Time | DB Access Time | Selected Access Time |
|---|---|---|---|---|
| 589 | 587 | 13 | 613 | 13 |
| 590 | 588 | 12 | 612 | 12 |
| 591 | 589 | 11 | 611 | 11 |
| 592 | 590 | 10 | 610 | 10 |
| 593 | 591 | 9 | 609 | 9 |
| 594 | 592 | 8 | 608 | 8 |
| 595 | 593 | 7 | 607 | 7 |
| 596 | 594 | 6 | 606 | 6 |
| 597 | 595 | 5 | 605 | 5 |
| 598 | 596 | 4 | 604 | 4 |
| 599 | 597 | 3 | 603 | 3 |
| 600 | 598 | 2 | 602 | 2 |
| 601 | 599 | 1 | 601 | 1 |
| →602 | 600 | 0 | 600 | 0← |

TABLE 3-7-continued

| HAP | D1 Access Time | DA Access Time | DB Access Time | Selected Access Time |
|---|---|---|---|---|
| 603 | 601 | 1 | 599 | 1 |
| 604 | 602 | 2 | 598 | 2 |
| 605 | 603 | 3 | 597 | 3 |
| 606 | 604 | 4 | 596 | 4 |
| 607 | 605 | 5 | 595 | 5 |
| 608 | 606 | 6 | 594 | 6 |
| 609 | 607 | 7 | 593 | 7 |
| 610 | 608 | 8 | 592 | 8 |
| 611 | 609 | 9 | 591 | 9 |
| 612 | 610 | 10 | 590 | 10 |
| 613 | 611 | 11 | 589 | 11 |
| 614 | 612 | 12 | 588 | 12 |
| 615 | 613 | 13 | 587 | 13 |
| 616 | 614 | 14 | 586 | 14 |
| 617 | 615 | 15 | 585 | 15 |
| 618 | 616 | 16 | 584 | 16 |
| 619 | 617 | 17 | 583 | 17 |
| 620 | 618 | 18 | 582 | 18 |
| 621 | 619 | 19 | 581 | 19 |
| 622 | 620 | 20 | 580 | 20 |
| 623 | 621 | 21 | 579 | 21 |
| 624 | 622 | 22 | 578 | 22 |
| 625 | 623 | 23 | 577 | 23 |
| 626 | 624 | 24 | 576 | 24 |
| 627 | 625 | 25 | 575 | 25 |
| 628 | 626 | 26 | 574 | 26 |
| 629 | 627 | 27 | 573 | 27 |
| 630 | 628 | 28 | 572 | 28 |
| 631 | 629 | 29 | 571 | 29 |
| 632 | 630 | 30 | 570 | 30 |
| 633 | 631 | 31 | 569 | 31 |
| 634 | 632 | 32 | 568 | 32 |
| 635 | 633 | 33 | 567 | 33 |
| 636 | 634 | 34 | 566 | 34 |
| 637 | 635 | 35 | 565 | 35 |
| 638 | 636 | 36 | 564 | 36 |
| 639 | 637 | 37 | 563 | 37 |
| 640 | 638 | 38 | 562 | 38 |
| 641 | 639 | 39 | 561 | 39 |
| 642 | 640 | 40 | 560 | 40 |
| 643 | 641 | 41 | 559 | 41 |
| 644 | 642 | 42 | 558 | 42 |
| 645 | 643 | 43 | 557 | 43 |
| 646 | 644 | 44 | 556 | 44 |
| 647 | 645 | 45 | 555 | 45 |
| 648 | 646 | 46 | 554 | 46 |

TABLE 3-8

| HAP | D1 Access Time | DA Access Time | DB Access Time | Selected Access Time |
|---|---|---|---|---|
| 889 | 887 | 287 | 313 | 287 |
| 890 | 888 | 288 | 312 | 288 |
| 891 | 889 | 289 | 311 | 289 |
| 892 | 890 | 290 | 310 | 290 |
| 893 | 891 | 291 | 309 | 291 |
| 894 | 892 | 292 | 308 | 292 |
| 895 | 893 | 293 | 307 | 293 |
| 896 | 894 | 294 | 306 | 294 |
| 897 | 895 | 295 | 305 | 295 |
| 898 | 896 | 296 | 304 | 296 |
| 899 | 897 | 297 | 303 | 297 |
| 900 | 898 | 298 | 302 | 298 |
| 901 | 899 | 299 | 301 | 299 |
| 902 | 900 | 300 | 300 | 300 |
| 903 | 901 | 301 | 299 | 299 |
| 904 | 902 | 302 | 298 | 298 |
| 905 | 903 | 303 | 297 | 297 |
| 906 | 904 | 304 | 296 | 296 |
| 907 | 905 | 305 | 295 | 295 |
| 908 | 906 | 306 | 294 | 294 |
| 909 | 907 | 307 | 293 | 293 |

TABLE 3-8-continued

| HAP | D1 Access Time | DA Access Time | DB Access Time | Selected Access Time |
|---|---|---|---|---|
| 910 | 908 | 308 | 292 | 292 |
| 911 | 909 | 309 | 291 | 291 |
| 912 | 910 | 310 | 290 | 290 |
| 913 | 911 | 311 | 289 | 289 |
| 914 | 912 | 312 | 288 | 288 |
| 915 | 913 | 313 | 287 | 287 |
| 916 | 914 | 314 | 286 | 286 |
| 917 | 915 | 315 | 285 | 285 |
| 918 | 916 | 316 | 284 | 284 |
| 919 | 917 | 317 | 283 | 283 |
| 920 | 918 | 318 | 282 | 282 |
| 921 | 919 | 319 | 281 | 281 |
| 922 | 920 | 320 | 280 | 280 |
| 923 | 921 | 321 | 279 | 279 |
| 924 | 922 | 322 | 278 | 278 |
| 925 | 923 | 323 | 277 | 277 |
| 926 | 924 | 324 | 276 | 276 |
| 927 | 925 | 325 | 275 | 275 |
| 928 | 926 | 326 | 274 | 274 |
| 929 | 927 | 327 | 273 | 273 |
| 930 | 928 | 328 | 272 | 272 |
| 931 | 929 | 329 | 271 | 271 |
| 932 | 930 | 330 | 270 | 270 |
| 933 | 931 | 331 | 269 | 269 |
| 934 | 932 | 332 | 268 | 268 |
| 935 | 933 | 333 | 267 | 267 |
| 936 | 934 | 334 | 266 | 266 |
| 937 | 935 | 335 | 265 | 265 |
| 938 | 936 | 336 | 264 | 264 |
| 939 | 937 | 337 | 263 | 263 |
| 940 | 938 | 338 | 262 | 262 |
| 941 | 939 | 339 | 261 | 261 |
| 942 | 940 | 340 | 260 | 260 |
| 943 | 941 | 341 | 259 | 259 |
| 944 | 942 | 342 | 258 | 258 |
| 945 | 943 | 343 | 257 | 257 |
| 946 | 944 | 344 | 256 | 256 |
| 947 | 945 | 345 | 255 | 255 |
| 948 | 946 | 346 | 254 | 254 |

TABLE 3-9

| HAP | D1 Access Time | DA Access Time | DB Access Time | Selected Access Time |
|---|---|---|---|---|
| 1189 | 1187 | 587 | 13 | 13 |
| 1190 | 1188 | 588 | 12 | 12 |
| 1191 | 1189 | 588 | 11 | 11 |
| 1192 | 1190 | 590 | 10 | 10 |
| 1193 | 1191 | 591 | 9 | 9 |
| 1194 | 1192 | 592 | 8 | 8 |
| 1195 | 1193 | 593 | 7 | 7 |
| 1196 | 1194 | 594 | 6 | 6 |
| 1197 | 1195 | 595 | 5 | 5 |
| 1198 | 1196 | 596 | 4 | 4 |
| 1199 | 1197 | 597 | 3 | 3 |
| 1200 | 1198 | 598 | 2 | 2 |
| 1201 | 1199 | 599 | 1 | 1 |
| →1202 | 1200 | 600 | 0 | 0← |
| 1203 | 1201 | 601 | 1 | 1 |
| 1204 | 1202 | 602 | 2 | 2 |
| 1205 | 1203 | 603 | 3 | 3 |
| 1206 | 1204 | 604 | 4 | 4 |
| 1207 | 1205 | 605 | 5 | 5 |
| 1208 | 1206 | 606 | 6 | 6 |
| 1209 | 1207 | 607 | 7 | 7 |
| 1210 | 1208 | 608 | 8 | 8 |
| 1211 | 1209 | 609 | 9 | 9 |
| 1212 | 1210 | 610 | 10 | 10 |
| 1213 | 1211 | 611 | 11 | 11 |
| 1214 | 1212 | 612 | 12 | 12 |
| 1215 | 1213 | 613 | 13 | 13 |
| 1216 | 1214 | 614 | 14 | 14 |

TABLE 3-9-continued

| HAP | D1 Access Time | DA Access Time | DB Access Time | Selected Access Time |
|---|---|---|---|---|
| 1217 | 1215 | 615 | 15 | 15 |
| 1218 | 1216 | 616 | 16 | 16 |
| 1219 | 1217 | 617 | 17 | 17 |
| 1220 | 1218 | 618 | 18 | 18 |
| 1221 | 1219 | 619 | 19 | 19 |
| 1222 | 1220 | 620 | 20 | 20 |
| 1223 | 1221 | 621 | 21 | 21 |
| 1224 | 1222 | 622 | 22 | 22 |
| 1225 | 1223 | 623 | 23 | 23 |
| 1226 | 1224 | 624 | 24 | 24 |
| 1227 | 1225 | 625 | 25 | 25 |
| 1228 | 1226 | 626 | 26 | 26 |
| 1229 | 1227 | 627 | 27 | 27 |
| 1230 | 1228 | 628 | 28 | 28 |
| 1231 | 1229 | 629 | 29 | 29 |
| 1232 | 1230 | 630 | 30 | 30 |
| 1233 | 1231 | 631 | 31 | 31 |
| 1234 | 1232 | 632 | 32 | 32 |
| 1235 | 1233 | 633 | 33 | 33 |
| 1236 | 1234 | 634 | 34 | 34 |
| 1237 | 1235 | 635 | 35 | 35 |
| 1238 | 1238 | 636 | 36 | 36 |
| 1239 | 1237 | 637 | 37 | 37 |
| 1240 | 1238 | 638 | 38 | 38 |
| 1241 | 1239 | 639 | 39 | 39 |
| 1242 | 1240 | 640 | 40 | 40 |
| 1243 | 1241 | 641 | 41 | 41 |
| 1244 | 1242 | 642 | 42 | 42 |
| 1245 | 1243 | 643 | 43 | 43 |
| 1246 | 1244 | 644 | 44 | 44 |
| 1247 | 1245 | 645 | 45 | 45 |
| 1248 | 1246 | 646 | 46 | 46 |

TABLE 3-10

| HAP | D1 Access Time | DA Access Time | DB Access Time | Selected Access Time |
|---|---|---|---|---|
| 1789 | 1787 | 1187 | 587 | 587 |
| 1790 | 1788 | 1188 | 588 | 588 |
| 1791 | 1789 | 1189 | 589 | 589 |
| 1792 | 1790 | 1190 | 590 | 590 |
| 1793 | 1791 | 1191 | 591 | 591 |
| 1794 | 1792 | 1192 | 592 | 592 |
| 1795 | 1793 | 1193 | 593 | 593 |
| 1796 | 1794 | 1194 | 594 | 594 |
| 1797 | 1795 | 1195 | 595 | 595 |
| 1798 | 1796 | 1196 | 596 | 596 |
| 1799 | 1797 | 1197 | 597 | 597 |
| Average Access Time | 897.50 | 499.17 | 500.84 | 199.17 |

TABLE 3-11

Assumption #3:
1800 blocks/track 4 Zones

| D1 Zone Offset | DA Zone Offset | DB Zone Offset | DC Zone Offset |
|---|---|---|---|
| 0 | 450 | 900 | 1350 |

| D1 Data Offset | DA Data Offset | DB Data Offset | DC Data Offset |
|---|---|---|---|
| 2 | 2 | 2 | 2 |

| HAP | D1 Access Time | DA Access Time | DB Access Time | DC Access Time | Selected Access Time |
|---|---|---|---|---|---|
| 0 | 2 | 452 | 902 | 1352 | 2 |
| 1 | 1 | 451 | 901 | 1351 | 1 |

TABLE 3-11-continued

| | | | | | |
|---|---|---|---|---|---|
| 2 | 0 | 450 | 900 | 1350 | 0 |
| 3 | 1 | 449 | 899 | 1349 | 1 |
| 4 | 2 | 448 | 898 | 1348 | 2 |
| 5 | 3 | 447 | 897 | 1347 | 3 |
| 6 | 4 | 446 | 896 | 1346 | 4 |
| 7 | 5 | 445 | 895 | 1345 | 5 |
| 8 | 6 | 444 | 894 | 1344 | 6 |
| 9 | 7 | 443 | 893 | 1343 | 7 |
| 10 | 8 | 442 | 892 | 1342 | 8 |
| 11 | 9 | 441 | 891 | 1341 | 9 |
| 12 | 10 | 440 | 890 | 1340 | 10 |
| 13 | 11 | 439 | 889 | 1339 | 11 |
| 14 | 12 | 438 | 888 | 1338 | 12 |
| 15 | 13 | 437 | 887 | 1337 | 13 |
| 16 | 14 | 436 | 886 | 1336 | 14 |
| 17 | 15 | 435 | 885 | 1335 | 15 |
| 18 | 16 | 434 | 884 | 1334 | 16 |
| 19 | 17 | 433 | 883 | 1333 | 17 |
| 20 | 18 | 432 | 882 | 1332 | 18 |
| 21 | 19 | 431 | 881 | 1331 | 19 |
| 22 | 20 | 430 | 880 | 1330 | 20 |
| 23 | 21 | 429 | 879 | 1329 | 21 |
| 24 | 22 | 428 | 878 | 1328 | 22 |
| 25 | 23 | 427 | 877 | 1327 | 23 |
| 26 | 24 | 426 | 876 | 1326 | 24 |
| 27 | 25 | 425 | 875 | 1325 | 25 |
| 28 | 26 | 424 | 874 | 1324 | 26 |
| 29 | 27 | 423 | 873 | 1323 | 27 |
| 30 | 28 | 422 | 872 | 1322 | 28 |
| 31 | 29 | 421 | 871 | 1321 | 29 |
| 32 | 30 | 420 | 870 | 1320 | 30 |
| 33 | 31 | 419 | 869 | 1319 | 31 |
| 34 | 32 | 418 | 868 | 1318 | 32 |
| 35 | 33 | 417 | 867 | 1317 | 33 |
| 36 | 34 | 416 | 866 | 1316 | 34 |
| 37 | 35 | 415 | 865 | 1315 | 35 |
| 38 | 36 | 414 | 864 | 1314 | 36 |
| 39 | 37 | 413 | 863 | 1313 | 37 |
| 40 | 38 | 412 | 862 | 1312 | 38 |
| 41 | 39 | 411 | 861 | 1311 | 39 |
| 42 | 40 | 410 | 860 | 1310 | 40 |
| 43 | 41 | 409 | 859 | 1309 | 41 |
| 44 | 42 | 408 | 858 | 1308 | 42 |
| 45 | 43 | 407 | 857 | 1307 | 43 |
| 46 | 44 | 406 | 856 | 1306 | 44 |
| 47 | 45 | 405 | 855 | 1305 | 45 |
| 48 | 46 | 404 | 854 | 1304 | 46 |

TABLE 3-12

| HAP | D1 Access Time | DA Access Time | DB Access Time | DC Access Time | Selected Access Time |
|---|---|---|---|---|---|
| 169 | 167 | 283 | 733 | 1183 | 167 |
| 170 | 168 | 282 | 732 | 1182 | 168 |
| 171 | 169 | 281 | 731 | 1181 | 169 |
| 172 | 170 | 280 | 730 | 1180 | 170 |
| 173 | 171 | 279 | 729 | 1179 | 171 |
| 174 | 172 | 278 | 728 | 1178 | 172 |
| 175 | 173 | 277 | 727 | 1177 | 173 |
| 176 | 174 | 276 | 726 | 1176 | 174 |
| 177 | 175 | 275 | 725 | 1175 | 175 |
| 178 | 176 | 274 | 724 | 1174 | 176 |
| 179 | 177 | 273 | 723 | 1173 | 177 |
| 180 | 178 | 272 | 722 | 1172 | 178 |
| 181 | 179 | 271 | 721 | 1171 | 179 |
| 182 | 180 | 270 | 720 | 1170 | 180 |
| 183 | 181 | 269 | 719 | 1169 | 181 |
| 184 | 182 | 268 | 718 | 1168 | 182 |
| 185 | 183 | 267 | 717 | 1167 | 183 |
| 186 | 184 | 266 | 716 | 1166 | 184 |
| 187 | 185 | 265 | 715 | 1165 | 185 |
| 188 | 186 | 264 | 714 | 1164 | 186 |
| 189 | 187 | 263 | 713 | 1163 | 187 |
| 190 | 188 | 262 | 712 | 1162 | 188 |

TABLE 3-12-continued

| HAP | D1 Access Time | DA Access Time | DB Access Time | DC Access Time | Selected Access Time |
|---|---|---|---|---|---|
| 191 | 189 | 261 | 711 | 1161 | 189 |
| 192 | 190 | 260 | 710 | 1160 | 190 |
| 193 | 191 | 259 | 709 | 1159 | 191 |
| 194 | 192 | 258 | 708 | 1158 | 192 |
| 195 | 193 | 257 | 707 | 1157 | 193 |
| 196 | 194 | 256 | 706 | 1156 | 194 |
| 197 | 195 | 255 | 705 | 1155 | 195 |
| 198 | 196 | 254 | 704 | 1154 | 196 |
| 199 | 197 | 253 | 703 | 1153 | 197 |
| 200 | 198 | 252 | 702 | 1152 | 198 |
| 201 | 199 | 251 | 701 | 1151 | 199 |
| 202 | 200 | 250 | 700 | 1150 | 200 |
| 203 | 201 | 249 | 699 | 1149 | 201 |
| 204 | 202 | 248 | 698 | 1148 | 202 |
| 205 | 203 | 247 | 697 | 1147 | 203 |
| 206 | 204 | 246 | 696 | 1146 | 204 |
| 207 | 205 | 245 | 695 | 1145 | 205 |
| 208 | 206 | 244 | 694 | 1144 | 206 |
| 209 | 207 | 243 | 693 | 1143 | 207 |
| 210 | 208 | 242 | 692 | 1142 | 208 |
| 211 | 209 | 241 | 691 | 1141 | 209 |
| 212 | 210 | 240 | 690 | 1140 | 210 |
| 213 | 211 | 239 | 689 | 1139 | 211 |
| 214 | 212 | 238 | 688 | 1138 | 212 |
| 215 | 213 | 237 | 687 | 1137 | 213 |
| 216 | 214 | 236 | 686 | 1136 | 214 |
| 217 | 215 | 235 | 685 | 1135 | 215 |
| 218 | 216 | 234 | 684 | 1134 | 216 |
| 219 | 217 | 233 | 683 | 1133 | 217 |
| 220 | 218 | 232 | 682 | 1132 | 218 |
| 221 | 219 | 231 | 681 | 1131 | 219 |
| 222 | 220 | 230 | 680 | 1130 | 220 |
| 223 | 221 | 229 | 679 | 1129 | 221 |
| 224 | 222 | 228 | 678 | 1128 | 222 |
| 225 | 223 | 227 | 677 | 1127 | 223 |
| 226 | 224 | 226 | 676 | 1126 | 224 |
| 227 | 225 | 225 | 675 | 1125 | 225 |
| 228 | 226 | 224 | 674 | 1124 | 224 |

TABLE 3-13

| HAP | D1 Access Time | DA Access Time | DB Access Time | DC Access Time | Selected Access Time |
|---|---|---|---|---|---|
| 409 | 407 | 43 | 493 | 943 | 43 |
| 410 | 408 | 42 | 492 | 942 | 42 |
| 411 | 409 | 41 | 491 | 941 | 41 |
| 412 | 410 | 40 | 490 | 940 | 40 |
| 413 | 411 | 39 | 489 | 939 | 39 |
| 414 | 412 | 38 | 488 | 938 | 38 |
| 415 | 413 | 37 | 487 | 937 | 37 |
| 416 | 414 | 36 | 486 | 936 | 36 |
| 417 | 415 | 35 | 485 | 935 | 35 |
| 418 | 416 | 34 | 484 | 934 | 34 |
| 419 | 417 | 33 | 483 | 933 | 33 |
| 420 | 418 | 32 | 482 | 932 | 32 |
| 421 | 419 | 31 | 481 | 931 | 31 |
| 422 | 420 | 30 | 480 | 930 | 30 |
| 423 | 421 | 29 | 479 | 929 | 29 |
| 424 | 422 | 28 | 478 | 928 | 28 |
| 425 | 423 | 27 | 477 | 927 | 27 |
| 426 | 424 | 26 | 476 | 926 | 26 |
| 427 | 425 | 25 | 475 | 925 | 25 |
| 428 | 426 | 24 | 474 | 924 | 24 |
| 429 | 427 | 23 | 473 | 923 | 23 |
| 430 | 428 | 22 | 472 | 922 | 22 |
| 431 | 429 | 21 | 471 | 921 | 21 |
| 432 | 430 | 20 | 470 | 920 | 20 |
| 433 | 431 | 19 | 469 | 919 | 19 |
| 434 | 432 | 18 | 468 | 918 | 18 |
| 435 | 433 | 17 | 467 | 917 | 17 |

TABLE 3-13-continued

| HAP | D1 Access Time | DA Access Time | DB Access Time | DC Access Time | Selected Access Time |
|---|---|---|---|---|---|
| 436 | 434 | 16 | 466 | 916 | 16 |
| 437 | 435 | 15 | 465 | 915 | 15 |
| 438 | 436 | 14 | 464 | 914 | 14 |
| 439 | 437 | 13 | 463 | 913 | 13 |
| 440 | 438 | 12 | 462 | 912 | 12 |
| 441 | 439 | 11 | 461 | 911 | 11 |
| 442 | 440 | 10 | 460 | 910 | 10 |
| 443 | 441 | 9 | 459 | 909 | 9 |
| 444 | 442 | 8 | 458 | 908 | 8 |
| 445 | 443 | 7 | 457 | 907 | 7 |
| 446 | 444 | 6 | 456 | 906 | 6 |
| 447 | 445 | 5 | 455 | 905 | 5 |
| 448 | 446 | 4 | 454 | 904 | 4 |
| 449 | 447 | 3 | 453 | 903 | 3 |
| 450 | 448 | 2 | 452 | 902 | 2 |
| 451 | 449 | 1 | 451 | 901 | 1 |
| →452 | 450 | 0 | 450 | 900 | 0← |
| 453 | 451 | 1 | 449 | 899 | 1 |
| 454 | 452 | 2 | 448 | 898 | 2 |
| 455 | 453 | 3 | 447 | 897 | 3 |
| 456 | 454 | 4 | 446 | 896 | 4 |
| 457 | 455 | 5 | 445 | 895 | 5 |
| 458 | 456 | 6 | 444 | 894 | 6 |
| 459 | 457 | 7 | 443 | 893 | 7 |
| 460 | 458 | 8 | 442 | 892 | 8 |
| 461 | 459 | 9 | 441 | 891 | 9 |
| 462 | 460 | 10 | 440 | 890 | 10 |
| 463 | 461 | 11 | 439 | 889 | 11 |
| 464 | 462 | 12 | 438 | 888 | 12 |
| 465 | 463 | 13 | 437 | 887 | 13 |
| 466 | 464 | 14 | 436 | 886 | 14 |
| 467 | 465 | 15 | 435 | 885 | 15 |
| 468 | 466 | 16 | 434 | 884 | 16 |

TABLE 3-14

| HAP | D1 Access Time | DA Access Time | DB Access Time | DC Access Time | Selected Access Time |
|---|---|---|---|---|---|
| 649 | 647 | 197 | 253 | 703 | 197 |
| 650 | 648 | 198 | 252 | 702 | 198 |
| 651 | 649 | 199 | 251 | 701 | 199 |
| 652 | 650 | 200 | 250 | 700 | 200 |
| 653 | 651 | 201 | 249 | 699 | 201 |
| 654 | 652 | 202 | 248 | 698 | 202 |
| 655 | 653 | 203 | 247 | 697 | 203 |
| 656 | 654 | 204 | 246 | 696 | 204 |
| 657 | 655 | 205 | 245 | 695 | 205 |
| 658 | 656 | 206 | 244 | 694 | 206 |
| 659 | 657 | 207 | 243 | 693 | 207 |
| 660 | 658 | 208 | 242 | 692 | 208 |
| 661 | 659 | 209 | 241 | 691 | 209 |
| 662 | 660 | 210 | 240 | 690 | 210 |
| 663 | 661 | 211 | 239 | 689 | 211 |
| 664 | 662 | 212 | 238 | 688 | 212 |
| 665 | 663 | 213 | 237 | 687 | 213 |
| 666 | 664 | 214 | 236 | 686 | 214 |
| 667 | 665 | 215 | 235 | 685 | 215 |
| 668 | 666 | 216 | 234 | 684 | 216 |
| 669 | 667 | 217 | 233 | 683 | 217 |
| 670 | 668 | 218 | 232 | 682 | 218 |
| 671 | 669 | 219 | 231 | 681 | 219 |
| 672 | 670 | 220 | 230 | 680 | 220 |
| 673 | 671 | 221 | 229 | 679 | 221 |
| 674 | 672 | 222 | 228 | 678 | 222 |
| 675 | 673 | 223 | 227 | 677 | 223 |
| 676 | 674 | 224 | 226 | 676 | 224 |
| 677 | 675 | 225 | 225 | 675 | 225 |
| 678 | 676 | 226 | 224 | 674 | 224 |
| 679 | 677 | 227 | 223 | 673 | 223 |
| 680 | 678 | 228 | 222 | 672 | 222 |

TABLE 3-14-continued

| HAP | D1 Access Time | DA Access Time | DB Access Time | DC Access Time | Selected Access Time |
|---|---|---|---|---|---|
| 681 | 679 | 229 | 221 | 671 | 221 |
| 682 | 680 | 230 | 220 | 670 | 220 |
| 683 | 681 | 231 | 219 | 669 | 219 |
| 684 | 682 | 232 | 218 | 668 | 218 |
| 685 | 683 | 233 | 217 | 667 | 217 |
| 686 | 684 | 234 | 216 | 666 | 216 |
| 687 | 685 | 235 | 215 | 665 | 215 |
| 688 | 686 | 236 | 214 | 664 | 214 |
| 689 | 687 | 237 | 213 | 663 | 213 |
| 690 | 688 | 238 | 212 | 662 | 212 |
| 691 | 689 | 239 | 211 | 661 | 211 |
| 692 | 690 | 240 | 210 | 660 | 210 |
| 693 | 691 | 241 | 209 | 659 | 209 |
| 694 | 692 | 242 | 208 | 658 | 208 |
| 695 | 693 | 243 | 207 | 657 | 207 |
| 696 | 694 | 244 | 206 | 656 | 206 |
| 697 | 695 | 245 | 205 | 655 | 205 |
| 698 | 696 | 246 | 204 | 654 | 204 |
| 699 | 697 | 247 | 203 | 653 | 203 |
| 700 | 698 | 248 | 202 | 652 | 202 |
| 701 | 699 | 249 | 201 | 651 | 201 |
| 702 | 700 | 250 | 200 | 650 | 200 |
| 703 | 701 | 251 | 199 | 649 | 199 |
| 704 | 702 | 252 | 198 | 648 | 198 |
| 705 | 703 | 253 | 197 | 647 | 197 |
| 706 | 704 | 254 | 196 | 646 | 196 |
| 707 | 705 | 255 | 195 | 645 | 195 |
| 708 | 706 | 256 | 194 | 644 | 194 |

TABLE 3-15

| HAP | D1 Access Time | DA Access Time | DB Access Time | DC Access Time | Selected Access Time |
|---|---|---|---|---|---|
| 889 | 887 | 437 | 13 | 463 | 13 |
| 890 | 888 | 438 | 12 | 462 | 12 |
| 891 | 889 | 439 | 11 | 461 | 11 |
| 892 | 890 | 440 | 10 | 460 | 10 |
| 893 | 891 | 441 | 9 | 459 | 9 |
| 894 | 892 | 442 | 8 | 458 | 8 |
| 895 | 893 | 443 | 7 | 457 | 7 |
| 896 | 894 | 444 | 6 | 456 | 6 |
| 897 | 895 | 445 | 5 | 455 | 5 |
| 898 | 896 | 446 | 4 | 454 | 4 |
| 899 | 897 | 447 | 3 | 453 | 3 |
| 900 | 898 | 448 | 2 | 452 | 2 |
| 901 | 899 | 449 | 1 | 451 | 1 |
| →902 | 900 | 450 | 0 | 450 | 0← |
| 903 | 901 | 451 | 1 | 449 | 1 |
| 904 | 902 | 452 | 2 | 448 | 2 |
| 905 | 903 | 453 | 3 | 447 | 3 |
| 906 | 904 | 454 | 4 | 446 | 4 |
| 907 | 905 | 455 | 5 | 445 | 5 |
| 908 | 906 | 456 | 6 | 444 | 6 |
| 909 | 907 | 457 | 7 | 443 | 7 |
| 910 | 908 | 458 | 8 | 442 | 8 |
| 911 | 909 | 459 | 9 | 441 | 9 |
| 912 | 910 | 460 | 10 | 440 | 10 |
| 913 | 911 | 461 | 11 | 439 | 11 |
| 914 | 912 | 462 | 12 | 438 | 12 |
| 915 | 913 | 463 | 13 | 437 | 13 |
| 916 | 914 | 464 | 14 | 436 | 14 |
| 917 | 915 | 465 | 15 | 435 | 15 |
| 918 | 916 | 466 | 16 | 434 | 16 |
| 919 | 917 | 467 | 17 | 433 | 17 |
| 920 | 918 | 468 | 18 | 432 | 18 |
| 921 | 919 | 469 | 19 | 431 | 19 |
| 922 | 920 | 470 | 20 | 430 | 20 |
| 923 | 921 | 471 | 21 | 429 | 21 |
| 924 | 922 | 472 | 22 | 428 | 22 |
| 925 | 923 | 473 | 23 | 427 | 23 |

TABLE 3-15-continued

| HAP | D1 Access Time | DA Access Time | DB Access Time | DC Access Time | Selected Access Time |
|---|---|---|---|---|---|
| 926 | 924 | 474 | 24 | 426 | 24 |
| 927 | 925 | 475 | 25 | 425 | 25 |
| 928 | 926 | 476 | 26 | 424 | 26 |
| 929 | 927 | 477 | 27 | 423 | 27 |
| 930 | 928 | 478 | 28 | 422 | 28 |
| 931 | 929 | 479 | 29 | 421 | 29 |
| 932 | 930 | 480 | 30 | 420 | 30 |
| 933 | 931 | 481 | 31 | 419 | 31 |
| 934 | 932 | 482 | 32 | 418 | 32 |
| 935 | 933 | 483 | 33 | 417 | 33 |
| 936 | 934 | 484 | 34 | 416 | 34 |
| 937 | 935 | 485 | 35 | 415 | 35 |
| 938 | 936 | 486 | 36 | 414 | 36 |
| 939 | 937 | 487 | 37 | 413 | 37 |
| 940 | 938 | 488 | 38 | 412 | 38 |
| 941 | 939 | 489 | 39 | 411 | 39 |
| 942 | 940 | 490 | 40 | 410 | 40 |
| 943 | 941 | 491 | 41 | 409 | 41 |
| 944 | 942 | 492 | 42 | 408 | 42 |
| 945 | 943 | 493 | 43 | 407 | 43 |
| 946 | 944 | 494 | 44 | 406 | 44 |
| 947 | 945 | 495 | 45 | 405 | 45 |
| 948 | 946 | 496 | 48 | 404 | 46 |

TABLE 3-16

| HAP | D1 Access Time | DA Access Time | DB Access Time | DC Access Time | Selected Access Time |
|---|---|---|---|---|---|
| 1069 | 1067 | 617 | 167 | 283 | 167 |
| 1070 | 1068 | 618 | 168 | 282 | 168 |
| 1071 | 1069 | 619 | 169 | 281 | 169 |
| 1072 | 1070 | 620 | 170 | 280 | 170 |
| 1073 | 1071 | 621 | 171 | 279 | 171 |
| 1074 | 1072 | 622 | 172 | 278 | 172 |
| 1075 | 1073 | 623 | 173 | 277 | 173 |
| 1076 | 1074 | 624 | 174 | 276 | 174 |
| 1077 | 1075 | 625 | 175 | 275 | 175 |
| 1078 | 1076 | 626 | 176 | 274 | 176 |
| 1079 | 1077 | 627 | 177 | 273 | 177 |
| 1080 | 1078 | 628 | 178 | 272 | 178 |
| 1081 | 1079 | 629 | 179 | 271 | 179 |
| 1082 | 1080 | 630 | 180 | 270 | 180 |
| 1083 | 1081 | 631 | 181 | 269 | 181 |
| 1084 | 1082 | 632 | 182 | 268 | 182 |
| 1085 | 1083 | 633 | 183 | 267 | 183 |
| 1086 | 1084 | 634 | 184 | 266 | 184 |
| 1087 | 1085 | 635 | 185 | 265 | 185 |
| 1088 | 1086 | 636 | 186 | 264 | 186 |
| 1089 | 1087 | 637 | 187 | 263 | 187 |
| 1090 | 1088 | 638 | 188 | 262 | 188 |
| 1091 | 1089 | 639 | 189 | 261 | 189 |
| 1092 | 1090 | 640 | 190 | 260 | 190 |
| 1093 | 1091 | 641 | 191 | 259 | 191 |
| 1094 | 1092 | 642 | 192 | 258 | 192 |
| 1095 | 1093 | 643 | 193 | 257 | 193 |
| 1096 | 1094 | 644 | 194 | 256 | 194 |
| 1097 | 1095 | 645 | 195 | 255 | 195 |
| 1098 | 1096 | 646 | 196 | 254 | 196 |
| 1099 | 1097 | 647 | 197 | 253 | 197 |
| 1100 | 1098 | 648 | 198 | 252 | 198 |
| 1101 | 1099 | 649 | 199 | 251 | 199 |
| 1102 | 1100 | 650 | 200 | 250 | 200 |
| 1103 | 1101 | 651 | 201 | 249 | 201 |
| 1104 | 1102 | 652 | 202 | 248 | 202 |
| 1105 | 1103 | 653 | 203 | 247 | 203 |
| 1106 | 1104 | 654 | 204 | 246 | 204 |
| 1107 | 1105 | 655 | 205 | 245 | 205 |
| 1108 | 1106 | 656 | 206 | 244 | 206 |
| 1109 | 1107 | 657 | 207 | 243 | 207 |
| 1110 | 1108 | 658 | 208 | 242 | 208 |

TABLE 3-16-continued

| HAP | D1 Access Time | DA Access Time | DB Access Time | DC Access Time | Selected Access Time |
|---|---|---|---|---|---|
| 1111 | 1109 | 659 | 209 | 241 | 209 |
| 1112 | 1110 | 660 | 210 | 240 | 210 |
| 1113 | 1111 | 661 | 211 | 239 | 211 |
| 1114 | 1112 | 662 | 212 | 238 | 212 |
| 1115 | 1113 | 663 | 213 | 237 | 213 |
| 1116 | 1114 | 664 | 214 | 236 | 214 |
| 1117 | 1115 | 665 | 215 | 235 | 215 |
| 1118 | 1116 | 666 | 216 | 234 | 216 |
| 1119 | 1117 | 667 | 217 | 233 | 217 |
| 1120 | 1118 | 668 | 218 | 232 | 218 |
| 1121 | 1119 | 669 | 219 | 231 | 219 |
| 1122 | 1120 | 670 | 220 | 230 | 220 |
| 1123 | 1121 | 671 | 221 | 229 | 221 |
| 1124 | 1122 | 672 | 222 | 228 | 222 |
| 1125 | 1123 | 673 | 223 | 227 | 223 |
| 1126 | 1124 | 674 | 224 | 226 | 224 |
| 1127 | 1125 | 675 | 225 | 225 | 225 |
| 1128 | 1126 | 676 | 226 | 224 | 224 |

TABLE 3-17

| HAP | D1 Access Time | DA Access Time | DB Access Time | DC Access Time | Selected Access Time |
|---|---|---|---|---|---|
| 1309 | 1307 | 857 | 407 | 43 | 43 |
| 1310 | 1308 | 858 | 408 | 42 | 42 |
| 1311 | 1309 | 859 | 409 | 41 | 41 |
| 1312 | 1310 | 860 | 410 | 40 | 40 |
| 1313 | 1311 | 861 | 411 | 39 | 39 |
| 1314 | 1312 | 862 | 412 | 38 | 38 |
| 1315 | 1313 | 863 | 413 | 37 | 37 |
| 1316 | 1314 | 864 | 414 | 36 | 36 |
| 1317 | 1315 | 865 | 415 | 35 | 35 |
| 1318 | 1316 | 866 | 416 | 34 | 34 |
| 1319 | 1317 | 867 | 417 | 33 | 33 |
| 1320 | 1318 | 868 | 418 | 32 | 32 |
| 1321 | 1319 | 869 | 419 | 31 | 31 |
| 1322 | 1320 | 870 | 420 | 30 | 30 |
| 1323 | 1321 | 871 | 421 | 29 | 29 |
| 1324 | 1322 | 872 | 422 | 28 | 28 |
| 1325 | 1323 | 873 | 423 | 27 | 27 |
| 1326 | 1324 | 874 | 424 | 26 | 26 |
| 1327 | 1325 | 875 | 425 | 25 | 25 |
| 1328 | 1326 | 876 | 426 | 24 | 24 |
| 1329 | 1327 | 877 | 427 | 23 | 23 |
| 1330 | 1328 | 878 | 428 | 22 | 22 |
| 1331 | 1329 | 879 | 429 | 21 | 21 |
| 1332 | 1330 | 880 | 430 | 20 | 20 |
| 1333 | 1331 | 881 | 431 | 19 | 19 |
| 1334 | 1332 | 882 | 432 | 18 | 18 |
| 1335 | 1333 | 883 | 433 | 17 | 17 |
| 1336 | 1334 | 884 | 434 | 16 | 16 |
| 1337 | 1335 | 885 | 435 | 15 | 15 |
| 1338 | 1336 | 886 | 436 | 14 | 14 |
| 1339 | 1337 | 887 | 437 | 13 | 13 |
| 1340 | 1338 | 888 | 438 | 12 | 12 |
| 1341 | 1339 | 889 | 439 | 11 | 11 |
| 1342 | 1340 | 890 | 440 | 10 | 10 |
| 1343 | 1341 | 891 | 441 | 9 | 9 |
| 1344 | 1342 | 892 | 442 | 8 | 8 |
| 1345 | 1343 | 893 | 443 | 7 | 7 |
| 1346 | 1344 | 894 | 444 | 6 | 6 |
| 1347 | 1345 | 895 | 445 | 5 | 5 |
| 1348 | 1346 | 896 | 446 | 4 | 4 |
| 1349 | 1347 | 897 | 447 | 3 | 3 |
| 1350 | 1348 | 898 | 448 | 2 | 2 |
| 1351 | 1349 | 899 | 449 | 1 | 1 |
| →1352 | 1350 | 900 | 450 | 0 | 0← |
| 1353 | 1351 | 901 | 451 | 1 | 1 |
| 1354 | 1352 | 902 | 452 | 2 | 2 |
| 1355 | 1353 | 903 | 453 | 3 | 3 |

TABLE 3-17-continued

| HAP | D1 Access Time | DA Access Time | DB Access Time | DC Access Time | Selected Access Time |
|---|---|---|---|---|---|
| 1356 | 1354 | 904 | 454 | 4 | 4 |
| 1357 | 1355 | 905 | 455 | 5 | 5 |
| 1358 | 1356 | 906 | 456 | 6 | 6 |
| 1359 | 1357 | 907 | 457 | 7 | 7 |
| 1360 | 1358 | 908 | 458 | 8 | 8 |
| 1361 | 1359 | 909 | 459 | 9 | 9 |
| 1362 | 1360 | 910 | 460 | 10 | 10 |
| 1363 | 1361 | 911 | 461 | 11 | 11 |
| 1364 | 1362 | 912 | 462 | 12 | 12 |
| 1365 | 1363 | 913 | 463 | 13 | 13 |
| 1366 | 1364 | 914 | 464 | 14 | 14 |
| 1367 | 1365 | 915 | 465 | 15 | 15 |
| 1368 | 1366 | 916 | 466 | 16 | 16 |

TABLE 3-18

| HAP | D1 Access Time | DA Access Time | DB Access Time | DC Access Time | Selected Access Time |
|---|---|---|---|---|---|
| 1789 | 1787 | 1337 | 887 | 437 | 437 |
| 1790 | 1788 | 1338 | 888 | 438 | 438 |
| 1791 | 1789 | 1339 | 889 | 439 | 439 |
| 1792 | 1790 | 1340 | 890 | 440 | 440 |
| 1793 | 1791 | 1341 | 891 | 441 | 441 |
| 1794 | 1792 | 1342 | 892 | 442 | 442 |
| 1795 | 1793 | 1343 | 893 | 443 | 443 |
| 1796 | 1794 | 1344 | 894 | 444 | 444 |
| 1797 | 1795 | 1345 | 895 | 445 | 445 |
| 1798 | 1796 | 1346 | 896 | 446 | 446 |
| 1799 | 1797 | 1347 | 897 | 447 | 447 |
| Average Access Time | 897.50 | 561.25 | 450.00 | 563.75 | 140.00 |

What is claimed is:

1. A method for improving access time in a data storage system comprising a plurality of serially accessible media and at least one media drive, comprising the steps of:

receiving a request to write data;

writing the data to a first serially accessible media at a first offset location; and writing the data to a second serially accessible media at a second offset location, wherein the first and second serially accessible media each have a first portion and a second portion, and wherein the first offset location is longitudinally positioned along the first portion of the first serially accessible media, and the second offset location is longitudinally positioned along the second portion of the second serially accessible media.

2. A method for improving access time in a data storage system comprising a plurality of serially accessible media and at least one media drive, comprising the steps of:

receiving a request to write data;

writing the data to a first serially accessible media at a first offset location; and writing the data to a second serially accessible media at a second offset location, wherein the first and second serially accessible media are different physical media devices, and wherein the first offset location and the second offset location are at the same offset location on each of the first and second serially accessible media.

3. A method for improving access time in a data storage system comprising a plurality of serially accessible media and at least one media drive, comprising the steps of:

receiving a request to write data;

writing the data to a first serially accessible media at a first offset location; and writing the data to a second serially accessible media at a second offset location; wherein the first and second serially accessible media each have a first half portion and a second half portion, and wherein the first serially accessible media is positioned to be first half portion biased after completion of the first writing step, and the second tape media is positioned to be second half portion biased after completion of the second writing step.

4. A system for improving access time in a data storage system comprising a plurality of serially accessible media and at least one media drive, comprising the steps of:

means for receiving a request to write data;

means for writing the data to a first serially accessible media at a first offset location; and means for writing the data to a second serially accessible media at a second offset location, wherein the first and second serially accessible media each have a first portion and a second portion, and wherein the first offset location is longitudinally positioned along the first portion of the first serially accessible media, and the second offset location is longitudinally positioned along the second portion of the second serially accessible media.

5. A system for improving access time in a data storage system comprising a plurality of serially accessible media and at least one media drive, comprising the steps of:

means for receiving a request to write data;

means for writing the data to a first serially accessible media at a first offset location; and means for writing the data to a second serially accessible media at a second offset location, wherein the first and second serially accessible media are different physical media devices, and wherein the first offset location and the second offset location are at the same offset location on each of the first and second serially accessible media.

6. A system for improving access time in a data storage system comprising a plurality of serially accessible media and at least one media drive, comprising the steps of:

means for receiving a request to write data;

means for writing the data to a first serially accessible media at a first offset location; and means for writing the data to a second serially accessible media at a second offset location, wherein the first and second serially accessible media each have a first half portion and a second half portion, and wherein the first serially accessible media is positioned to be first half portion biased after completion of the first writing step, and the second tape media is positioned to be second half portion biased after completion of the second writing step.

7. A method for reading data in a data storage system comprising a plurality of serially accessible media and at least one media drive, comprising the steps of:

receiving a request to read data;

selecting a serially accessible media by determining which of the plurality of serially accessible media containing a copy of the requested data has the lowest access time;

loading the selected serially accessible media into a media drive; and reading the data from the loaded serially accessible media.

8. The method of claim 7, wherein the lowest access time is determined by determining which of the plurality of serially accessible media containing the requested data has a head access point closest to the requested data.

9. The method of claim 8, wherein the head access point is maintained in a table associated with each serially accessible media.

10. The method of claim 8 wherein the head access point is maintained in a meta-label associated with each serially accessible media.

11. The method of claim 8, wherein the head access point information for a given serially accessible media is updated after data access to said given serially accessible media.

12. The method of claim 7, wherein an access time is determined by:

$$|(\text{head access point})-(\text{zone offset}+\text{data offset w/in zone})|$$

where head access point is media location that will be adjacent to/in contact with a transducer when the media is first loaded into a media drive, zone offset is offset of a particular zone from logical beginning of the media, and data offset w/in zone is offset of a particular data item from logical beginning of the particular zone.

13. A method for reading data in a data storage system comprising a plurality of serially accessible media and a plurality of media drives, comprising the steps of:

receiving a request from a requestor to read data;

determining which of the plurality of serially accessible media contain a copy of the requested data;

loading at least some of the determined serially accessible media into respective media drives;

seeking to a copy of the data in each of the loaded media drives; and reading the data from the media drive that is first to access the data; and providing the read data to the requester.

14. A method for improving access time in a data storage system comprising a plurality of serially accessible media and at least one media drive, comprising the steps of:

receiving a request to write data;

writing the data to a first serially accessible media at a first offset location;

writing the data to a second serially accessible media at a second offset location;

receiving a request to read the data;

selecting a serially accessible media by determining which of the plurality of serially accessible media containing a copy of the requested data has the lowest access time;

loading the selected serially accessible media into a media drive; and reading the data from the loaded serially accessible media.

15. The method of claim 14, wherein the lowest access time is determined by determining which of the plurality of serially accessible media containing the requested data has a head access point closest to the requested data.

16. The method of claim 15, wherein the head access point is maintained in a table associated with each serially accessible media.

17. The method of claim 15 wherein the head access point is maintained in a meta-label associated with each serially accessible media.

18. The method of claim 15, wherein the head access point information for a given serially accessible media is updated after writing data to said given serially accessible media.

* * * * *